US012804375B2

(12) United States Patent
Li et al.

(10) Patent No.: US 12,804,375 B2
(45) Date of Patent: Nov. 17, 2026

(54) METHOD AND APPARATUS FOR SERVICE CONTROL

(71) Applicant: Telefonaktiebolaget LM Ericsson (publ), Stockholm (SE)

(72) Inventors: Xiaoming Li, Shanghai (CN); Nianshan Shi, Järfälla (SE); Chuanxin Liu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 18/702,603

(22) PCT Filed: Oct. 19, 2022

(86) PCT No.: PCT/CN2022/126128
§ 371 (c)(1),
(2) Date: Apr. 18, 2024

(87) PCT Pub. No.: WO2023/066286
PCT Pub. Date: Apr. 27, 2023

(65) Prior Publication Data

US 2025/0294337 A1 Sep. 18, 2025

(30) Foreign Application Priority Data

Oct. 20, 2021 (WO) ................ PCT/CN2021/125017

(51) Int. Cl.
*H04W 8/08* (2009.01)
*H04W 8/20* (2009.01)
(Continued)

(52) U.S. Cl.
CPC ............... *H04W 8/08* (2013.01); *H04W 8/20* (2013.01); *H04W 8/22* (2013.01); *H04W 36/0022* (2013.01)

(58) Field of Classification Search
CPC ........... H04W 8/08; H04W 8/20; H04W 8/22; H04W 36/0022; H04W 36/00224; H04W 36/14
(Continued)

(56) References Cited

U.S. PATENT DOCUMENTS

2020/0053134 A1* 2/2020 Niemi ................. H04L 65/1016
2020/0120551 A1 4/2020 Mukherjee
(Continued)

FOREIGN PATENT DOCUMENTS

CN 113329355 A 8/2021
WO 2019190365 A1 10/2019

OTHER PUBLICATIONS

Nokia et al (S2-20xxxx, EPS Fallback CR Show of hands question CC#2B, 3GPP TSG SA WG2#141E, Elbonia xx-xx, Oct. 2020) (Year: 2020).*
(Continued)

*Primary Examiner* — Xuan Lu
(74) *Attorney, Agent, or Firm* — Withrow & Terranova, PLLC

(57) ABSTRACT

Embodiments of the present disclosure provide a method and apparatus for service control. A method performed by an access network node in a first network comprises receiving a message comprising information indicating whether a service over the first network is supported or allowed or preferred from an access and mobility node in the first network. The method further comprises handling the service based on the information.

18 Claims, 15 Drawing Sheets

(51) Int. Cl.
*H04W 8/22* (2009.01)
*H04W 36/00* (2009.01)
*H04W 36/14* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0275259 | A1 | 8/2020 | Zhu et al. | |
| 2021/0068020 | A1* | 3/2021 | Ke | H04W 4/50 |
| 2021/0105691 | A1 | 4/2021 | Zhu et al. | |
| 2022/0369092 | A1* | 11/2022 | Lee | H04W 8/082 |
| 2023/0308955 | A1* | 9/2023 | Fu | H04W 28/0268 |

OTHER PUBLICATIONS

Author Unknown, "Technical Specification Group Services and System Aspects; System architecture for the 5G System (5GS); Stage 2 (Release 16)," Technical Specification 23.501, Version 16.10.0, Sep. 2021, 3GPP Organizational Partners, 453 pages.
Author Unknown, "Technical Specification Group Services and System Aspects; System architecture for the 5G System (5GS); Stage 2 (Release 17)," Technical Specification 23.501, Version 17.2.0, Sep. 2021, 3GPP Organizational Partners, 542 pages.
Author Unknown, "Technical Specification Group Services and System Aspects; Procedures for the 5G System (5GS); Stage 2 (Release 16)," Technical Specification 23.502, Version 16.10.0, Sep. 2021, 3GPP Organizational Partners, 614 pages.
Author Unknown, "Technical Specification Group Services and System Aspects; Procedures for the 5G System (5GS); Stage 2 (Release 17)," Technical Specification 23.502, Version 17.2.1, Sep. 2021, 3GPP Organizational Partners, 712 pages.
Author Unknown, "Technical Specification Group Services and System Aspects; Architecture enhancements to facilitate communications with packet data networks and applications (Release 16)," Technical Specification 23.682, Version 16.9.0, Mar. 2021, 3GPP Organizational Partners, 135 pages.
Author Unknown, "Technical Specification Group Core Network and Terminals; Non-Access-Stratum (NAS) protocol for 5G System (5GS); Stage 3; (Release 16)," Technical Specification 24.501, Version 16.10.0, Sep. 2021, 3GPP Organizational Partners, 712 pages.
Author Unknown, "Technical Specification Group Radio Access Network; NG-RAN; NG Application Protocol (NGAP) (Release 16)," Technical Specification 38.413, Version 16.7.0, Oct. 2021, 3GPP Organizational Partners, 474 pages.
International Search Report and Written Opinion for International Patent Application No. PCT/CN2022/126128, mailed Jan. 12, 2023, 11 pages.

* cited by examiner

METHOD AND APPARATUS FOR SERVICE CONTROL

This application is a 35 U.S.C. § 371 national phase filing of International Application No. PCT/CN2022/126128, filed Oct. 19, 2022, which claims the benefit of International Application No. PCT/CN2021/125017, filed Oct. 20, 2021, the disclosures of which are incorporated herein by reference in their entireties.

TECHNICAL FIELD

The non-limiting and exemplary embodiments of the present disclosure generally relate to the technical field of communications, and specifically to methods and apparatuses for service control.

BACKGROUND

This section introduces aspects that may facilitate a better understanding of the disclosure. Accordingly, the statements of this section are to be read in this light and are not to be understood as admissions about what is in the prior art or what is not in the prior art.

Communication networks for example LTE (Long Term Evolution) and NR (new radio) as defined by 3rd Generation Partnership Project (3GPP) may provide and control various services such as voice service, video service, multimedia service, etc.

For example, the voice service may be provided in Evolved Packet System (EPS) and NR. There are two ways to offer voice service for 5G Stand Alone (SA) end users. One way is Voice over NR (VONR), which means QoS (quality of service) flow (5QI (5G QoS Identifier)=1) for voice bearer is supported from end-to-end perspective, so UE can have the voice service over IMS (IP (Internet protocol) Multimedia Subsystem) PDU (Protocol Data Unit) session in 5G network. The other way is EPS fallback for IMS voice, which is defined in clause 4.13.6.1 of 3GPP TS 23.502 V17.2.1 (the disclosure of which is incorporated by reference herein in its entirety) as below.

When a UE camps on NG-RAN (next generation radio access network) in a 5GS (5G system), and the UE has established an IMS PDU session in a 5GC (5G core network) and also registered in an IMS domain, in case an MO (Mobile Originated) or MT (Mobile Terminated) IMS call is initiated, the 5GC will request the NG-RAN to setup a QoS flow (5QI=1) for voice bearer via a PDU session resource modification procedure. If the NG-RAN doesn't support the setup of a QoS flow (5QI=1) for voice bearer or it is configured to support EPS fallback for IMS voice, it can decide to trigger fallback to EPS, taking into account UE capabilities, indication from AMF (Access and mobility Function) that "Redirection for EPS fallback for voice is possible" (received as part of initial context setup as defined in 3GPP TS 38.413 V16.7.0, the disclosure of which is incorporated by reference herein in its entirety), network configuration (e.g. N26 availability configuration) and radio conditions.

Clause 5.16.3.2 of 3GPP TS 23.501 V17.2.0, the disclosure of which is incorporated by reference herein in its entirety, described IMS voice over PS (Packet Switched) Session Supported Indication over 3GPP access as following.

The serving PLMN (Public Land Mobile Network) AMF shall send an indication toward the UE during the Registration procedure over 3GPP access to indicate if an IMS voice over PS session is supported or not supported in 3GPP access and non-3GPP access. A UE with "IMS voice over PS" voice capability over 3GPP access should take this indication into account when performing voice domain selection, as described in clause 5.16.3.5 of 3GPP TS 23.501 V17.2.0.

The serving PLMN AMF may only indicate IMS voice over PS session supported over 3GPP access in one of the following cases:

- If the network and the UE are able to support IMS voice over PS session in the current Registration Area with a 5G QOS Flow that supports voice as specified in clause 5.7 of 3GPP TS 23.501 V17.2.0.
- If the network or the UE are not able to support IMS voice over PS session over NR connected to 5GC, but is able for one of the following:
- If the network and the UE are able to support IMS voice over PS session over E-UTRA (Evolved Universal Terrestrial Radio Access) connected to 5GC, and the NG-RAN supports a handover or redirection to E-UTRA connected to 5GC for this UE at QoS Flow establishment for IMS voice;
- If the UE supports handover to EPS, the EPS supports IMS voice, and the NG-RAN supports a handover to EPS for this UE at QoS Flow establishment for IMS voice; or
- If the UE supports redirection to EPS, the EPS supports IMS voice, and the NG-RAN supports redirection to EPS for this UE at QoS Flow establishment for IMS voice.
- If the network is not able to provide a successful IMS voice over PS session over E-UTRA connected to 5GC, but is able for one of the following:
- If the UE supports handover to EPS, the EPS supports IMS voice, and the NG-RAN supports a handover to EPS for this UE at QoS Flow establishment for IMS voice; or
- If the UE supports redirection to EPS, the EPS supports IMS voice, and the NG-RAN supports redirection to EPS for this UE at QoS Flow establishment for IMS voice.

The serving PLMN provides this indication based e.g. on local policy, UE capabilities, HPLMN (Home Public Land Mobile Network), whether IP address preservation is possible, whether NG-RAN to UTRAN (Universal Terrestrial Radio Access Network) Single Radio Voice Call Continuity (SRVCC) is supported and how extended NG-RAN coverage is, and the Voice Support Match Indicator from the NG-RAN (see 3GPP TS 23.502 V17.2.1 clause 4.2.8a). The AMF in serving PLMN shall indicate that IMS voice over PS is supported only if the serving PLMN has a roaming agreement that covers support of IMS voice with the HPLMN. This indication is per Registration Area."

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

From AMF perspective, either VoNR or EPS fallback for voice session is supported, AMF shall send an indication toward a UE during a registration procedure over 3GPP access to indicate that an IMS voice over PS session is supported. And regardless of EPS fallback for voice session or VoNR, the SMF anyway needs to trigger an establishment of a QoS flow (5QI=1) towards the NG-RAN when an MO or MT IMS call is initiated. It's up to the NG-RAN that decides to use EPS fallback for voice session or VoNR if it once receives the "Redirection for EPS fallback for voice is possible" indication from AMF. If EPS fallback for voice session is used, the NG-RAN should reject a PDU session resource modification with a specific cause "IMS voice EPS fallback or RAT (Radio Access Technology) fallback triggered". If VONR is used, the NG-RAN should accept the PDU session resource modification and establish a QoS flow (5QI=1).

If both VoNR and EPS fallback for voice session are supported by the NG-RAN node, then it's totally up to the NG-RAN to decide which way to offer such voice service.

There are some problems for service control in the existing network. For example, 3GPP network cannot provide flexible control of service (such as VoNR or Voice EPS fallback) in 5GC network.

AMF can decide whether EPS fallback for voice session is allowed or not by setting such indication to the NG-RAN node such as gNB, but AMF has no way to indicate whether VoNR is allowed or not allowed per current 3GPP definition. AMF has no knowledge if the NG-RAN node supports VONR or not. In addition, AMF also has no way to indicate whether VoNR or EPS fallback for voice session is preferred per current 3GPP definition.

Some operators may require flexible control of service. For example, the operator may want to provide "Voice EPS fallback" only for all inbound roaming subscriber (maybe due to no VoNR roaming agreement), and VoNR is preferred for home subscriber only. However the current 3GPP specification can not provide a solution to fulfill such requirement.

Table 1 shows an example of existing solutions of voice service control in 3GPP network. As shown in Table 1, from AMF perspective, either VoNR or EPS fallback for voice session is supported, AMF shall send an IMS voice over PS session over 3GPP access indicator (IMS-VoPS-3GPP) (NAS (Non-Access-Statum) indication to UE) toward a UE and the IMS voice over PS session over 3GPP access indicator is set to IMS voice over PS session supported over 3GPP access.

Case 1. AMF intention is VoNR only. When redirection for Voice EPS Fallback is set to the value of "Not Possible" and NG-RAN supports VONR, NG-RAN will perform VoNR setup. When redirection for Voice EPS Fallback is set to the value of "Not Possible" and NG-RAN doesn't support VONR, VONR will be failed in 5GC network.

Case 2. AMF intention is either VoNR or EPS fallback. When redirection for Voice EPS Fallback is set to the value of "Possible" and NG-RAN doesn't support VONR, NG-RAN will perform EPS fallback. When redirection for Voice EPS Fallback is set to the value of "Possible" and NG-RAN supports VONR, NG-RAN will perform either VoNR setup or EPS Fallback by design choice.

Case 3. AMF intention is EPS fallback only. When redirection for Voice EPS Fallback is set to the value of "Possible" and NG-RAN doesn't support VONR, NG-RAN will perform EPS fallback. However when redirection for Voice EPS Fallback is set to the value of "Possible" and NG-RAN supports VONR, NG-RAN will perform either VoNR setup or EPS Fallback for example by design choice.

From Table 1, it can be seen that AMF can flexibly control how to set up the voice service in some cases. In addition, AMF also has no way to indicate whether VoNR or EPS fallback for voice session is preferred per current 3GPP definition.

TABLE 1

| AMF intention | IMS voice over PS session over 3GPP access indicator (IMS-VoPS-3GPP) (NAS indication to UE) | Redirection for Voice EPS Fallback(indication to NG-RAN) can be set to values as "Not Possible, Possible" | NG RAN outcome if NG-RAN doesn't support VoNR | NG RAN outcome if NG-RAN supports VoNR |
|---|---|---|---|---|
| VoNR only | IMS voice over PS session supported over 3GPP access | Not possible | VoNR will be failed in 5GC network | Perform VoNR setup |
| Either VoNR or EPS fallback | IMS voice over PS session supported over 3GPP access | Possible | Perform Voice EPS fallback | Perform either VoNR setup or Voice EPS Fallback by design choice |
| EPS fallback only | IMS voice over PS session supported over 3GPP access | Possible | Perform Voice EPS fallback | Perform either VoNR setup or Voice EPS Fallback by design choice |

To overcome or mitigate at least one above mentioned problems or other problems, the embodiments of the present disclosure propose an improved service control solution.

In a first aspect of the disclosure, there is provided a method performed by an access network node in a first network. The method comprises receiving a message comprising information indicating whether a service over the first network is supported or allowed or preferred from an access and mobility node in the first network. The method further comprises handling the service based on the information.

In an embodiment, whether the service over the first network is supported or allowed or preferred is decided based on at least one of capability of the first network, capability of a user equipment (UE), subscription data of the UE, capability of the access network node, or a local policy.

In an embodiment, the access and mobility node comprises AMF and the access network node comprises next generation NodeB (gNB).

In an embodiment, the first network comprises new radio (NR).

In an embodiment, the information comprises an information element of support of voice over NR (VONR).

In an embodiment, the information element of support of VoNR is set to a value of at least one of possible, which indicates that Access and mobility Function (AMF) allows VONR, not-possible, which indicates that AMF does not allows VoNR, or preferred, which indicates that AMF allows and prefers VoNR.

In an embodiment, the information further indicates whether a redirection for the service for a second network fallback is supported or allowed or preferred.

In an embodiment, the second network comprises Evolved Packet System (EPS).

In an embodiment, the information comprises an information element of Redirection for Voice EPS Fallback.

In an embodiment, the information element of Redirection for Voice EPS Fallback is set to a value of at least one of possible, which indicates that AMF/UE supports the redirection for voice for EPS Fallback and AMF support of VoNR is unspecified, not-possible, which indicates that AMF/UE does not support the redirection for voice for EPS Fallback and AMF support of VoNR is unspecified, voice-EPS-fallback-possible-VoNR-not-possible, which indicates that AMF/UE supports the redirection for voice for EPS Fallback and AMF support of VoNR is not allowed, voice-EPS-fallback-not-possible-VoNR-possible, which indicates that AMF/UE does not support the redirection for voice for EPS Fallback and AMF support of VoNR is allowed, voice-EPS-fallback-preferred-VoNR-possible, which indicates that AMF/UE supports and prefers the redirection for voice for EPS Fallback and AMF support of VONR is allowed, or voice-EPS-fallback-possible-VoNR-preferred, which indicates that AMF/UE supports the redirection for voice for EPS Fallback and AMF support of VoNR is allowed and preferred.

In an embodiment, the message comprises at least one of a next generation application protocol (NGAP) initial context setup request message, a handover request message, or a path switch request acknowledge message.

In an embodiment, the service comprises voice service.

In an embodiment, handling the service based on the information comprises at least one of: when the access and mobility node does not allow the service over the first network, the access network node supports the service over the first network, and a redirection for the service for a second network fallback is supported, performing the second network fallback, when the access and mobility node supports and prefers the service over the first network, the access network node supports the service over the first network, setting up the service over the first network, or when the access and mobility node prefers a redirection for the service for a second network fallback, the access network node supports the redirection for the service for a second network fallback, performing the second network fallback.

In a second aspect of the disclosure, there is provided a method performed by an access and mobility node in a first network. The method comprises sending a message comprising information indicating whether a service over the first network is supported or allowed or preferred to an access network node in the first network.

In an embodiment, the method further comprises deciding whether the service over the first network is supported or allowed or preferred.

In an embodiment, whether the service over the first network is supported or allowed or preferred is decided based on at least one of capability of the first network, capability of a user equipment (UE), subscription data of the UE, capability of the access network node, or a local policy.

In an embodiment, the access and mobility node comprises AMF and the access network node comprises next generation NodeB (gNB).

In an embodiment, the first network comprises new radio (NR).

In an embodiment, the information comprises an information element of support of voice over NR (VONR).

In an embodiment, the information element of support of VoNR is set to a value of at least one of possible, which indicates that Access and mobility Function (AMF) allows VONR, not-possible, which indicates that AMF does not allows VoNR, or preferred, which indicates that AMF allows and prefers VoNR.

In an embodiment, the information further indicates whether a redirection for the service for a second network fallback is supported or allowed or preferred.

In an embodiment, the second network comprises Evolved Packet System (EPS).

In an embodiment, the information comprises an information element of Redirection for Voice EPS Fallback.

In an embodiment, the information element Redirection for Voice EPS Fallback is set to a value of at least one of: possible, which indicates that AMF/UE supports the redirection for voice for EPS Fallback and AMF support of VoNR is unspecified, not-possible, which indicates that AMF/UE does not support the redirection for voice for EPS Fallback and AMF support of VoNR is unspecified, voice-EPS-fallback-possible-VoNR-not-possible, which indicates that AMF/UE supports the redirection for voice for EPS Fallback and AMF support of VoNR is not allowed, voice-EPS-fallback-not-possible-VoNR-possible, which indicates that AMF/UE does not support the redirection for voice for EPS Fallback and AMF support of VoNR is allowed, voice-EPS-fallback-preferred-VoNR-possible, which indicates that AMF/UE supports and prefers the redirection for voice for EPS Fallback and AMF support of VoNR is allowed, or voice-EPS-fallback-possible-VoNR-preferred, which indicates that AMF/UE supports the redirection for voice for EPS Fallback and AMF support of VoNR is allowed and preferred.

In an embodiment, the message comprises at least one of a next generation application protocol (NGAP) initial context setup request message, a handover request message, or a path switch request acknowledge message.

In an embodiment, the service comprises voice service.

In a third aspect of the disclosure, there is provided an access network node in a first network. The access network node comprises a processor and a memory coupled to the processor. Said memory contains instructions executable by said processor. Said access network node is operative to receive a message comprising information indicating whether a service over the first network is supported or allowed or preferred from an access and mobility node in the first network. Said access network node is further operative to handle the service based on the information.

In a fourth aspect of the disclosure, there is provided an access and mobility node in a first network. The access and mobility node comprises a processor and a memory coupled to the processor. Said memory contains instructions executable by said processor. Said access and mobility node is operative to send a message comprising information indicating whether a service over the first network is supported or allowed or preferred to an access network node in the first network.

In a fifth aspect of the disclosure, there is provided an access network node. The access network node comprises a receiving module and a handling module. The receiving module may be configured to receive a message comprising information indicating whether a service over the first network is supported or allowed or preferred from an access and mobility node in the first network. The handling module may be configured to handle the service based on the information.

In a sixth aspect of the disclosure, there is provided an access and mobility node. The access and mobility node comprises a sending module. The sending module may be configured to send a message comprising information indicating whether a service over the first network is supported or allowed or preferred to an access network node in the first network.

In an embodiment, the access and mobility node further comprises a deciding module configured to decide whether the service over the first network is supported or allowed or preferred.

In another aspect of the disclosure, there is provided a computer program product comprising instructions which when executed by at least one processor, cause the at least one processor to perform the method according to any one of the first and second aspects.

In another aspect of the disclosure, there is provided a computer-readable storage medium storing instructions which when executed by at least one processor, cause the at least one processor to perform the method according to any one of the first and second aspects.

In another aspect of the disclosure, there is provided a communication system including a host computer. The host computer includes processing circuitry configured to provide user data and a communication interface configured to forward the user data to a cellular network for transmission to a terminal device. The cellular network includes the network device above mentioned access network node, and/or the terminal device.

In embodiments of the present disclosure, the system further includes the terminal device. The terminal device is configured to communicate with the network device.

In embodiments of the present disclosure, the processing circuitry of the host computer is configured to execute a host application, thereby providing the user data; and the terminal device includes processing circuitry configured to execute a client application associated with the host application.

In another aspect of the disclosure, there is provided a communication system including a host computer and a network device. The host computer includes a communication interface configured to receive user data originating from a transmission from a terminal device. The transmission is from the terminal device to the network device. The network device is above mentioned access network node, and/or the terminal device.

In embodiments of the present disclosure, the processing circuitry of the host computer is configured to execute a host application. The terminal device is configured to execute a client application associated with the host application, thereby providing the user data to be received by the host computer.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device which may perform any step of the method according to the first aspect of the present disclosure.

In another aspect of the disclosure, there is provided a communication system including a host computer. The host computer may comprise processing circuitry configured to provide user data, and a communication interface configured to forward the user data to a cellular network for transmission to a terminal device. The cellular network may comprise a network device having a radio interface and processing circuitry. The network device's processing circuitry may be configured to perform any step of the method according to the first aspect of the present disclosure.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device. The network device may perform any step of the method according to the first aspect of the present disclosure.

In another aspect of the disclosure, there is provided a communication system including a host computer. The host computer may comprise processing circuitry configured to provide user data, and a communication interface configured to forward user data to a cellular network comprising the network device for transmission to a terminal device. The terminal device may comprise a radio interface and processing circuitry. The network device may perform any step of the method according to the first aspect of the present disclosure In another aspect of the disclosure, there is provided a method implemented in a communication system which may include a host computer, a network device and a terminal device. The method may comprise, at the host computer, receiving user data transmitted to the network device from the terminal device. The network device may perform any step of the method according to the first aspect of the present disclosure.

In another aspect of the disclosure, there is provided a communication system including a host computer. The host computer may comprise a communication interface configured to receive user data originating from a transmission from a terminal device to a network device. The terminal device may comprise a radio interface and processing circuitry. The network device may perform any step of the method according to the first aspect of the present disclosure In another aspect of the disclosure, there is provided a method implemented in a communication system which may include a host computer, a network device and a terminal device. The method may comprise, at the host computer, receiving, from the network device, user data originating from a transmission which the network device has received from the terminal device. The network device may perform any step of the method according to the first aspect of the present disclosure.

In another aspect of the disclosure, there is provided a communication system which may include a host computer. The host computer may comprise a communication interface configured to receive user data originating from a transmission from a terminal device to a network device. The network device may comprise a radio interface and processing circuitry. The network device's processing circuitry may be configured to perform any step of the method according to the first aspect of the present disclosure.

Embodiments herein may provide many advantages, of which a non-exhaustive list of examples follows. In some embodiments herein, the proposed solutions can achieve flexible control of service (such as VoNR or voice EPS Fallback) for example based on a local policy in the access and mobility node such as AMF. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
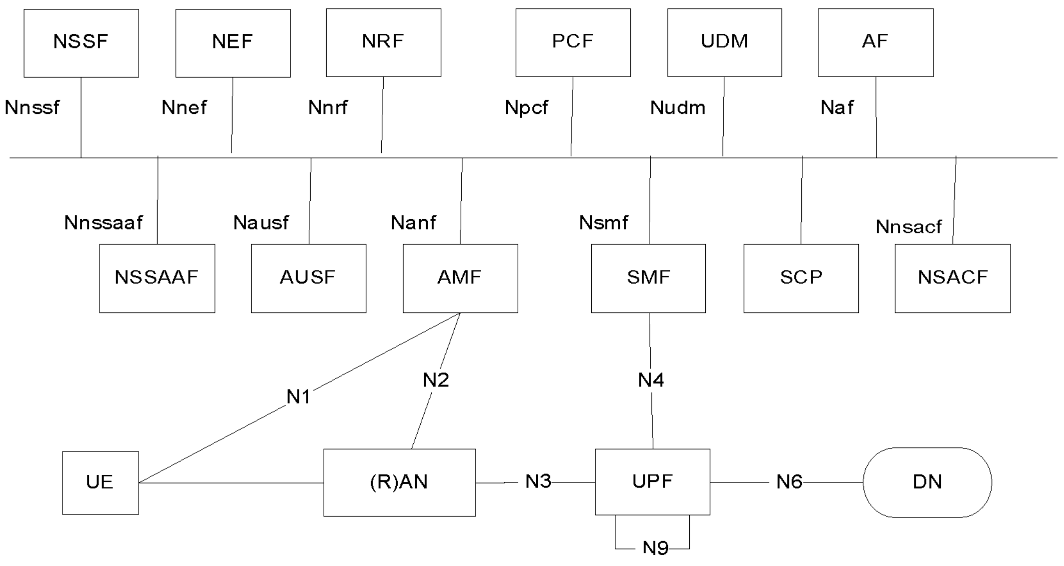
FIG. 1*a* schematically shows a high level architecture in a 5G network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" or "network entity" refers to any suitable network function (NF) which can be implemented in/as a network function (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The network device may be an access network device (such as radio access network node) with accessing function in a communication network via which a terminal device accesses to the network and receives services therefrom. The access network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 1B:
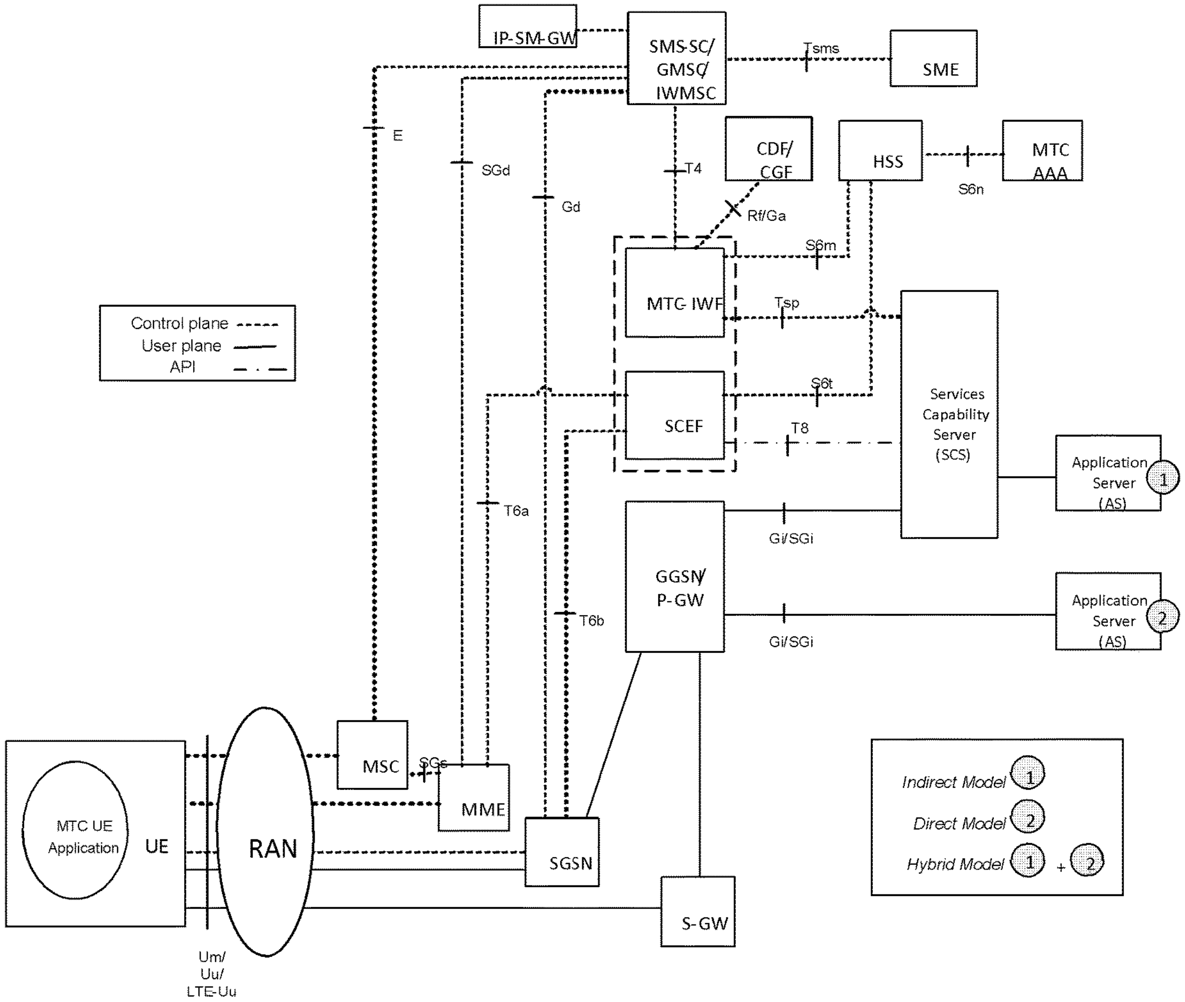
FIG. 1*b* schematically shows system architecture in a 4G network according to an embodiment of the present disclosure.
Figure 1C:
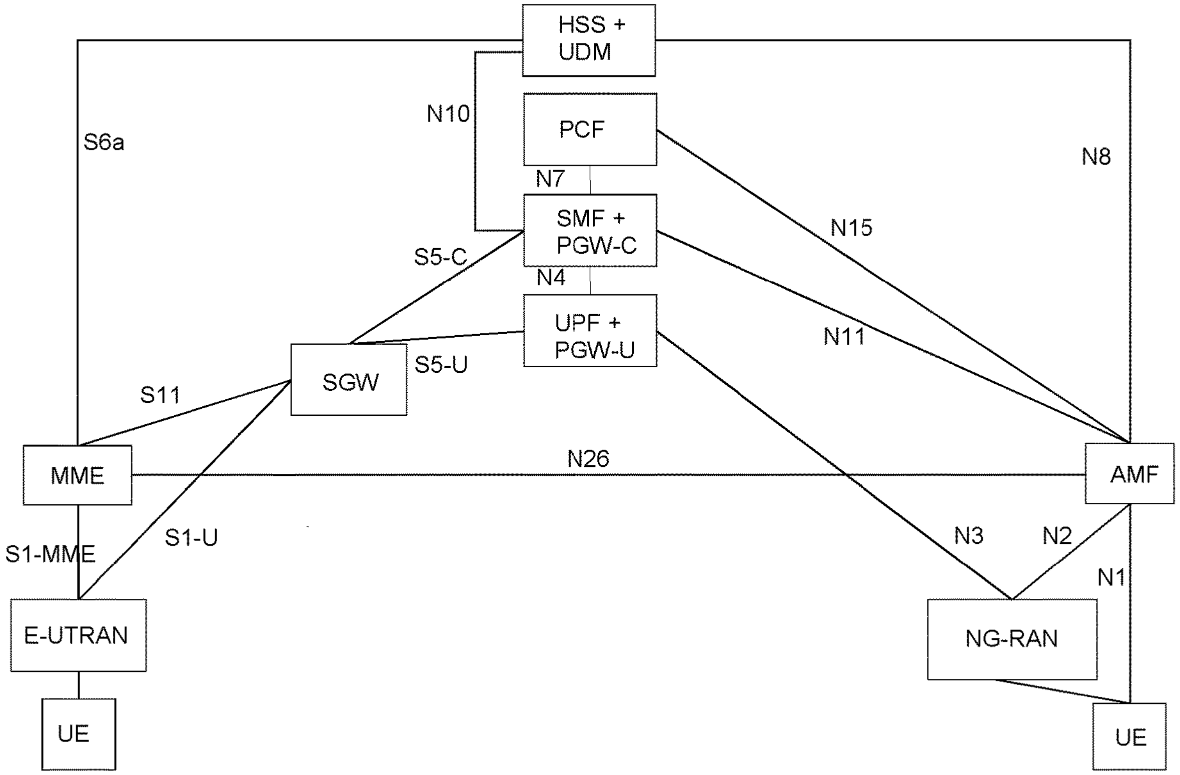
FIG. 1*c* schematically shows non-roaming architecture for interworking between 5GS and EPC/E-UTRAN according to an embodiment of the present disclosure.

Although the subject matter described herein may be implemented in any appropriate type of system using any suitable components, the embodiments disclosed herein are described in relation to a communication system complied with the exemplary system architectures illustrated in FIGS. 1a-1c. For simplicity, the system architectures of FIGS. 1a-1c only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a high level architecture in a 5G network according to an embodiment of the present disclosure. The architecture of FIG. 1a is same as FIG. 4.2.3-1 as described in 3GPP TS 23.501 V17.2.0, the disclosure of which is incorporated by reference herein in its entirety. The system architecture of FIG. 1a may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), NSACF (Network Slice Admission Control Function), etc.

In accordance with an exemplary embodiment, the UE can establish a signaling connection with the AMF over the reference point N1, as illustrated in FIG. 1a. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1a, the exemplary system architecture also contains the service-based interfaces such as Nnrf, Nnef, Nausf, Nudm, Npcf, Namf, Nnsacf and Nsmf exhibited by NFs such as the NRF, the NEF, the AUSF, the UDM, the PCF, the AMF, the NSACF and the SMF. In addition, FIG. 1a also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1a may be responsible for functions such as session management, mobility management, authentication, security, etc. The AUSF, AMF, DN, NEF, NRF, NSSF, PCF, SMF, UDM, UPF, AF, UE, (R)AN, SCP, NSACF may include the functionality for example as defined in clause 6.2 of 3GPP TS 23.501 V17.2.0.

Figure 4:
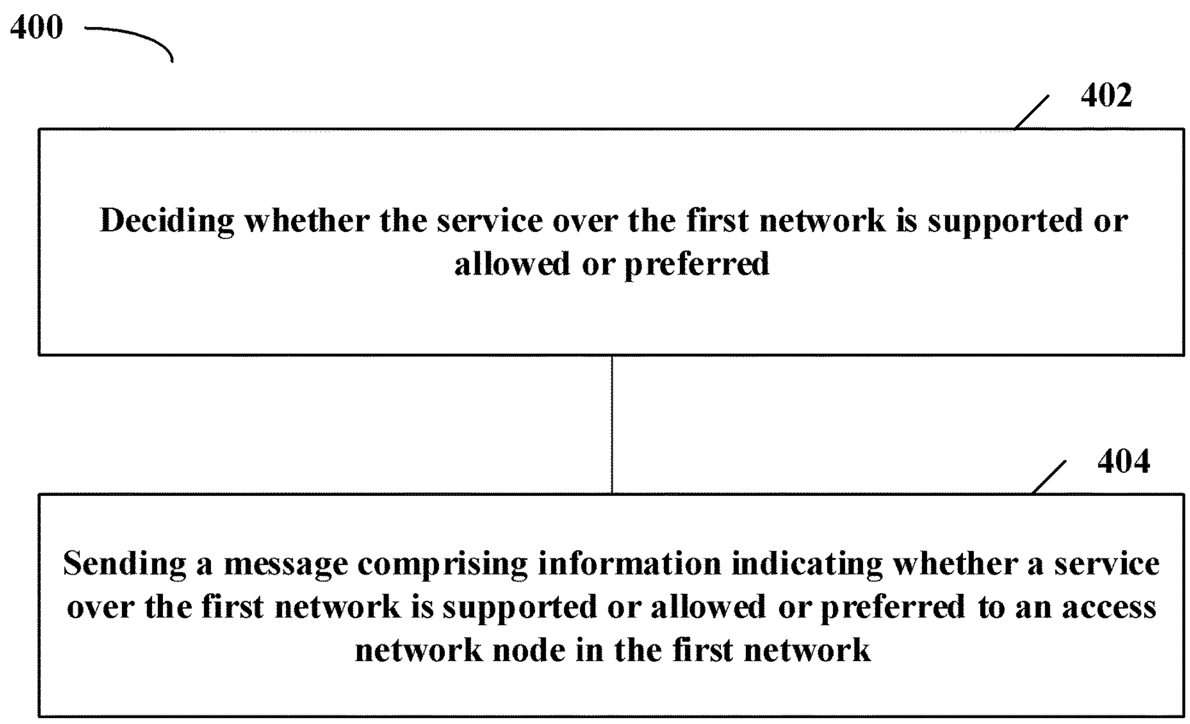
FIG. 4 shows a flowchart of a method according to another embodiment of the present disclosure.

FIG. 1b schematically shows system architecture in a 4G network according to an embodiment of the present disclosure, which is the same as FIG. 4.2-1a of 3GPP TS 23.682 V16.9.0, the disclosure of which is incorporated by reference herein in its entirety. The system architecture of FIG. 1b may comprise some exemplary elements such as Services Capability Server (SCS), Application Server (AS), SCEF (Service Capability Exposure Function), HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC (Short Message Service-Service Centre/Gateway MSC/InterWorking MSC) IP-SM-GW (Internet protocol Short Message Gateway). The network elements and interfaces as shown in FIG. 1b may be same as the corresponding network elements and interfaces as described in 3GPP TS 23.682 V16.9.0.

The system architecture shows the architecture for a UE used for MTC connecting to the 3GPP network (UTRAN (Universal Terrestrial Radio Access Network), E-UTRAN (Evolved UTRAN), GERAN (GSM EDGE (Enhanced Data rates for GSM Evolution) Radio Access Network), etc.) via the Um/Uu/LTE-Uu interfaces. The system architecture also shows the 3GPP network service capability exposure to SCS and AS.

As further illustrated in FIG. 1b, the exemplary system architecture also contains various reference points.

Tsms: Reference point used by an entity outside the 3GPP network to communicate with UEs used for MTC via SMS (Short Message Service).

Tsp: Reference point used by a SCS to communicate with the MTC-IWF related control plane signaling.

T4: Reference point used between MTC-IWF and the SMS-SC in the HPLMN.

T6a: Reference point used between SCEF and serving MME.

T6b: Reference point used between SCEF and serving SGSN.

T8: Reference point used between the SCEF and the SCS/AS.

Som: Reference point used by MTC-IWF to interrogate HSS/HLR (Home Location Register).

Son: Reference point used by MTC-AAA to interrogate HSS/HLR.

S6t: Reference point used between SCEF and HSS.

SGs: Reference point used between MSC and MME.

Gi/SGi: Reference point used between GGSN/P-GW and application server and between GGSN/P-GW and SCS.

Rf/Ga: Reference point used between MTC-IWF and CDF/CGF.

Gd: Reference point used between SMS-SC/GMSC/IWMSC and SGSN.

SGd: Reference point used between SMS-SC/GMSC/IWMSC and MME.

E: Reference point used between SMS-SC/GMSC/IWMSC and MSC.

The end-to-end communications, between the MTC Application in the UE and the MTC Application in the external network, uses services provided by the 3GPP system, and optionally services provided by a Services Capability Server (SCS).

The MTC Application in the external network is typically hosted by an Application Server (AS) and may make use of an SCS for additional value added services. The 3GPP system provides transport, subscriber management and other communication services including various architectural enhancements motivated by, but not restricted to, MTC (e.g. control plane device triggering).

Different models are foreseen for machine type of traffic in what relates to the communication between the AS and the 3GPP system and based on the provider of the SCS. The different architectural models that are supported by the Architectural Reference Model include the Direct Model, Indirect Model and Hybrid Model as described in 3GPP TS 23.682 V16.9.0.

FIG. 1*c* schematically shows non-roaming architecture for interworking between 5GS and EPC (Evolved Packet Core)/E-UTRAN (Evolved Universal Terrestrial Radio Access Network) according to an embodiment of the present disclosure. The architecture of FIG. 1*c* is same as FIG. 4.3.1-1 as described in 3GPP TS 23.501 V17.2.0. N26 interface is an inter-CN interface between the MME and 5GS AMF in order to enable interworking between EPC and the NG core. Support of N26 interface in the network is optional for interworking. N26 supports subset of the functionalities (essential for interworking) that are supported over S10. PGW-C+SMF and UPF+PGW-U are dedicated for interworking between 5GS and EPC, which are optional and are based on UE MM (Mobility Management) Core Network Capability and UE subscription. UEs that are not subject to 5GS and EPC interworking may be served by entities not dedicated for interworking, i.e. by either by PGW or SMF/UPF. There can be another UPF (not shown in FIG. 1*c*) between the NG-RAN and the UPF+PGW-U, i.e. the UPF+PGW-U can support N9 towards an additional UPF, if needed.

Figure 2:
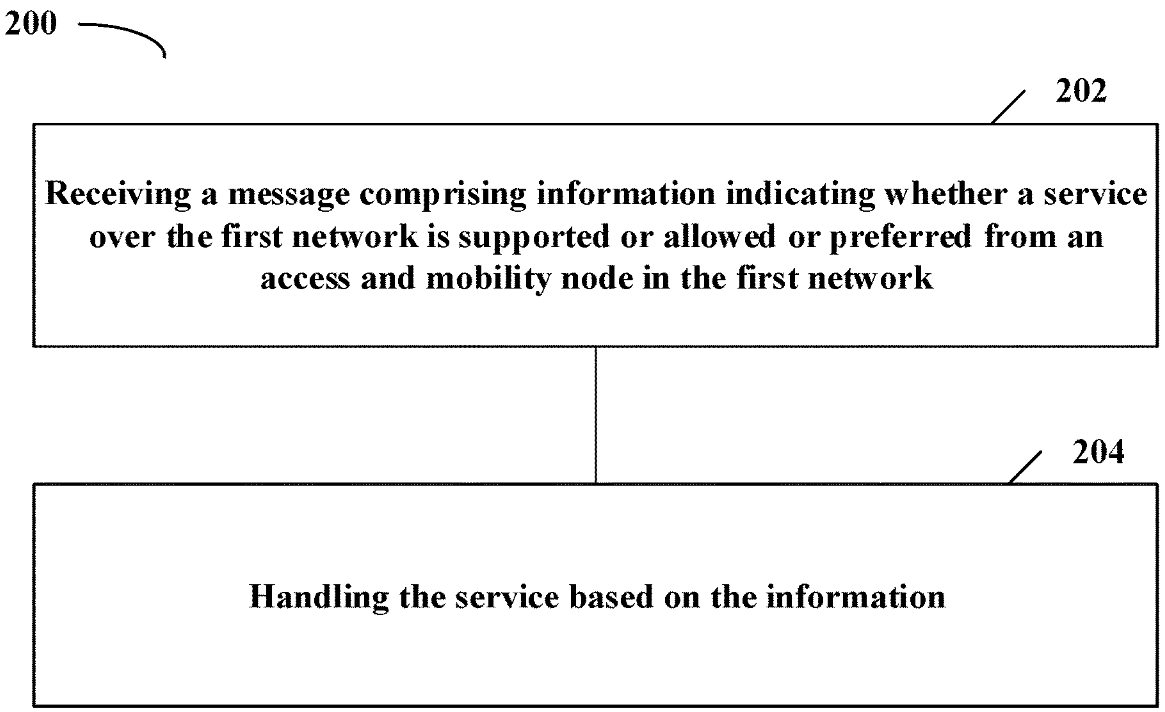
FIG. 2 shows a flowchart of a method according to an embodiment of the present disclosure.

FIG. 2 shows a flowchart of a method according to an embodiment of the present disclosure, which may be performed by an apparatus implemented in or at or as an access network node in a first network or communicatively coupled to the access network node in the first network. As such, the apparatus may provide means or modules for accomplishing various parts of the method 200 as well as means or modules for accomplishing other processes in conjunction with other components.

The first network may be any suitable network such as 5G network or sixth generation network as specified by 3GPP. In an embodiment, the first network may comprise new radio (NR).

The access network node may be any suitable network device or function with accessing function in a communication network via which a terminal device accesses to the network and receives services therefrom. In an embodiment, the access network node may comprise next generation NodeB (gNB).

At block 202, the access network node may receive a message comprising information indicating whether a service over the first network is supported or allowed or preferred from an access and mobility node in the first network.

The access and mobility node may be any suitable network device or function with accessing function and mobility function. In an embodiment, the access and mobility node may comprise AMF.

The service may be any suitable service such as voice service, video service, multimedia service, etc. In an embodiment, the service may comprise voice service. The service may be related to a UE.

The message may be any suitable message which can be sent from the access and mobility node to the access network node. In an embodiment, the message may comprise at least one of a next generation application protocol (NGAP) initial context setup request message, a handover request message, or a path switch request acknowledge message as described in 3GPP TS 38.413 V16.7.0 and 3GPP TS 23.502 V17.2.1. In another embodiment, the message may comprise any other suitable message which can be sent from AMF to NG-RAN node as described in 3GPP TS 38.413 V16.7.0 and 3GPP TS 23.502 V17.2.1. For example, the message may comprise UE CONTEXT MODIFICATION REQUEST message as described in 3GPP TS 38.413 V16.7.0.

When the information indicate that the service over the first network is supported, it may mean that the core network of the first network and the access and mobility node support the service over the first network.

When the information indicate that the service over the first network is not supported, it may mean that the core network of the first network and the access and mobility node does not support the service over the first network.

When the information indicate that the service over the first network is allowed, it may mean that the core network of the first network and the access and mobility node support the service over the first network and the access and mobility node allows the service over the first network.

When the information indicate that the service over the first network is not allowed, it may mean that the core network of the first network and the access and mobility node support the service over the first network and the access and mobility node does not allow the service over the first network.

When the information indicate that the service over the first network is preferred, it may mean that the core network of the first network and the access and mobility node support the service over the first network and the access and mobility node prefers the service over the first network.

When the information indicate that the service over the first network is not preferred, it may mean that the core network of the first network and the access and mobility node support the service over the first network and the access and mobility node does not prefer the service over the first network.

Whether the service over the first network is supported or allowed or preferred may be decided based on various factors such as capability of the first network, capability of a user equipment (UE), capability of the access network node, local policy, security requirement, network quality, network load, subscription data of the UE, etc. In an embodiment, whether the service over the first network is supported or allowed or preferred is decided based on at least one of:

capability of the first network,
capability of a user equipment (UE),
subscription data of the UE,
capability of the access network node, or
a local policy.

The capability of the first network, the capability of a user equipment (UE), the subscription data of the UE, the capability of the access network node, or the local policy may comprise any suitable information which can be used to decide whether the service over the first network is supported or allowed or preferred. For example, the capability of the first network may indicate whether the service over the first network is supported or allowed or preferred by the core network. The capability of a user equipment (UE) may indicate whether the service over the first network is supported or allowed or preferred by the UE. The subscription data of the UE may indicate whether UE supports or allows or prefers the service over the first network. The capability of the access network node whether the access network node supports or allows or prefers the service over the first network. The local policy may indicate whether the service over the first network is supported or allowed or preferred for example for a UE or a group UEs. For example, the local policy may be defined as following: providing "Voice EPS fallback" only for all inbound roaming subscriber (maybe due to no VoNR roaming agreement), and VoNR is preferred for home subscriber only.

The information may be any suitable information such as new information or modified exiting information.

In an embodiment, the information may comprise an information element of support of voice over NR (VONR).

In an embodiment, the information element of support of VoNR is set to a value of at least one of:

possible, which indicates that Access and mobility Function (AMF) allows VONR,
not-possible, which indicates that AMF does not allows VoNR, or
preferred, which indicates that AMF allows and prefers VoNR.

An example of implementation of the information element of support of VoNR is to add a new IE (information element) in NGAP INITIAL CONTEXT SETUP REQUEST message. Table 2 is an example of the new IE. This IE is used to indicate whether the AMF allows to setup VoNR. It is noted that Support of VoNR may be set to any other suitable value which can indicate whether the VoNR is supported or allowed or preferred.

TABLE 2

| Support of VoNR | | | | |
|---|---|---|---|---|
| IE/Group Name | Presence | Range | IE type and reference | Semantics description |
| Support of VoNR | M | | ENUMERATED (possible, not-possible, . . .) | Indicate if AMF allows VoNR. |

The new IE as shown in Table 2 can be applied to HANDOVER REQUEST, PATH SWITCH REQUEST ACKNOWLEDGE or UE CONTEXT MODIFICATION REQUEST as described in 3GPP TS 38.413 V16.7.0.

In an embodiment, the information further indicates whether a redirection for the service for a second network fallback is supported or allowed or preferred. In this embodiment, this information may be used to indicate that the access and mobility node and the UE support the redirection for the service for a second network fallback. This information is also used to indicate whether the service over the first network is supported or allowed or preferred.

The second network may be any suitable network such as 4G network as specified by 3GPP. In an embodiment, the second network may comprise Evolved Packet System (EPS).

In an embodiment, the information may comprise an information element of Redirection for Voice EPS Fallback as described in clause 9.3.1.116 of 3GPP TS 38.413 V16.7.0.

In an embodiment, the information element of Redirection for Voice EPS Fallback is set to a value of at least one of:

possible, which indicates that AMF/UE supports the redirection for voice for EPS Fallback and AMF support of VoNR is unspecified, not-possible, which indicates that AMF/UE does not support the redirection for voice for EPS Fallback and AMF support of VoNR is unspecified, voice-EPS-fallback-possible-VoNR-not-possible, which indicates that AMF/UE supports the redirection for voice for EPS Fallback and AMF support of VoNR is not allowed, voice-EPS-fallback-not-possible-VoNR-possible, which indicates that AMF/UE does not support the redirection for voice for EPS Fallback and AMF support of VoNR is allowed, voice-EPS-fallback-preferred-VoNR-possible, which indicates that AMF/UE supports and prefers the redirection for voice for EPS Fallback and AMF support of VoNR is allowed, or voice-EPS-fallback-possible-VoNR-preferred, which indicates that AMF/UE supports the redirection for voice for EPS Fallback and AMF support of VoNR is allowed and preferred.

An example of implementation of the information element of Redirection for Voice EPS Fallback is to update an existing IE in NGAP INITIAL CONTEXT SETUP REQUEST message as described in clause 9.3.1.116 of 3GPP TS 38.413 V16.7.0.

Table 3 is an example of IE of Redirection for Voice EPS Fallback. This IE is used to indicate that the AMF and the UE support the redirection for voice for EPS Fallback. This IE is also used to indicate that the AMF disallows to setup VoNR.

TABLE 3

| IE/Group Name | Presence | Range | IE type and reference | Semantics description |
|---|---|---|---|---|
| Redirection for Voice EPS Fallback | M | | ENUMERATED (possible, not-possible, . . . , voice-EPS-fallback-possible-VoNR-not-possible) | Value "possible" indicates AMF/UE support the redirection for voice for EPS Fallback. AMF support of VoNR is unspecified; Value "not-possible" indicates AMF/UE does not support the redirection for voice for EPS Fallback. AMF support of VoNR is unspecified; Value "voice-EPS-fallback-possible-VoNR-not-possible" indicates thatAMF/UE support the redirection for voice for EPS Fallback. AMF support of VoNR is not allowed. |

In Table 3, Redirection for Voice EPS Fallback may be set to possible, not-possible, . . . , voice-EPS-fallback-possible-VoNR-not-possible. The code point "possible, not-possible" is kept for backwards compatibility purpose. It is used to indicate if the "Redirection for Voice EPS Fallback" is possible or not. Value "possible" indicates AMF/UE support the redirection for voice for EPS Fallback and AMF support of VoNR is unspecified. Value "not-possible" indicates AMF/UE does not support the redirection for voice for EPS Fallback and AMF support of VoNR is unspecified. When AMF support of VoNR is unspecified, it is up to NG-RAN to determine to perform either VoNR setup or EPS Fallback for example by design choice. The addition code point "voice-EPS-fallback-possible-VoNR-not-possible" is used to indicate that VoNR is not allowed. Further code points can be added depends on the cases to be differentiated. For example, value "voice-EPS-fallback-possible-VoNR-not-possible" indicates that AMF/UE support the redirection for voice for EPS Fallback and AMF support of VoNR is not allowed.

It is note that Redirection for Voice EPS Fallback may be set to any other suitable value which can indicate whether VoNR is supported or allowed or preferred and/or whether Redirection for Voice EPS Fallback is supported or allowed or preferred. For example, AMF may indicate to NG-RAN node its preference, for example if VoNR or voice Fallback to EPC is to be performed.

The IE as shown in Table 3 can be applied to HANDOVER REQUEST, PATH SWITCH REQUEST ACKNOWLEDGE or UE CONTEXT MODIFICATION REQUEST as described in 3GPP TS 38.413 V16.7.0.

At block 204, the access network node may handle the service based on the information.

For example, the indication can be used in the following way:

AMF to decide, based on the policy, if the VoNR and/or voice EPS Fallback is possible/allowed;

AMF sends to the NG-RAN node the "Redirection for Voice EPS Fallback" and "Support of VONR" accordingly, NG-RAN node upon the reception of the indicators, decide further on how to handle the voice service. E.g. if the "Support of VONR" is not possible/allowed, NG-RAN node will not setup VoNR.

In an embodiment, when the access and mobility node does not allow the service over the first network, the access network node supports the service over the first network, and a redirection for the service for a second network fallback is supported, the access network node may perform the second network fallback for the service.

In an embodiment, when the access and mobility node supports and prefers the service over the first network, the access network node supports the service over the first network, the access network node may set up the service over the first network.

In an embodiment, when the access and mobility node prefers a redirection for the service for a second network fallback, the access network node supports the redirection for the service for a second network fallback, the access network node may perform the second network fallback for the service.

The Table 4 summarizes some supported use cases with the new indication of "Support of VONR" to NG-RAN. This allows NG-RAN node do right decision based on the indication from AMF. And AMF can also have local policy for different end users, regarding the way to offer voice services.

TABLE 4

| AMF intention | IMS voice over PS session over 3GPP access indicator (IMS-VoPS-3GPP) (NAS indication to UE) | Redirection for Voice EPS Fallback(indication to NG-RAN) | Voice over NR (indication to NG-RAN) | NG-RAN outcome if NG-RAN doesn't support VoNR | NG-RAN outcome if NG-RAN supports VoNR |
|---|---|---|---|---|---|
| VoNR only | IMS voice over PS session supported over 3GPP access | Not possible | Possible | VoNR will be failed in 5GC network | Perform VoNR setup |

TABLE 4-continued

| AMF intention | IMS voice over PS session over 3GPP access indicator (IMS-VoPS-3GPP) (NAS indication to UE) | Redirection for Voice EPS Fallback(indication to NG-RAN) | Voice over NR (indication to NG-RAN) | NG-RAN outcome if NG-RAN doesn't support VoNR | NG-RAN outcome if NG-RAN supports VoNR |
|---|---|---|---|---|---|
| Either VoNR or EPS fallback | IMS voice over PS session supported over 3GPP access | Possible | Possible | Perform Voice EPS fallback | Perform either VoNR setup or Voice EPS Fallback by design choice |
| EPS fallback only | IMS voice over PS session supported over 3GPP access | Possible | Not possible | Perform Voice EPS fallback | Perform Voice EPS Fallback only |

The Table 5 summarizes all the supported use cases with the new code point "voice-EPS-fallback-possible-VoNR-not-possible". This allows NG-RAN node do right decision based on the indication from AMF. And AMF can also have local policy for different end users, regarding the way to offer Voice services.

TABLE 5

| AMF intention | IMS voice over PS session over 3GPP access indicator (IMS-VoPS-3GPP) (NAS indication to UE) | Redirection for Voice EPS Fallback(indication to NG-RAN) | NG-RAN outcome if NG-RAN doesn't support VoNR | NG-RAN outcome if NG-RAN supports VoNR |
|---|---|---|---|---|
| VoNR only | IMS voice over PS session supported over 3GPP access | Not possible | VoNR will be failed in 5GC network | Perform VoNR setup |
| Either VoNR or EPS fallback | IMS voice over PS session supported over 3GPP access | Possible | Perform Voice EPS fallback | Perform either VoNR setup or Voice EPS Fallback by design choice |
| EPS fallback only | IMS voice over PS session supported over 3GPP access | voice-EPS-fallback-possible-VoNR-not-possible | Perform Voice EPS fallback | Perform Voice EPS Fallback only |

In an embodiment, to achieve the operator policy, AMF is allowed to indicate to NG-RAN node that if VoNR is allowed or not. Upon the reception of the indication, NG-RAN node should analyze the indications related to the IMS services and decide how to perform. In the case that NG-RAN node supports VONR, if the AMF indicates that the "VONR is not allowed, not-possible", NG-RAN node will not setup VoNR.

Figure 3:
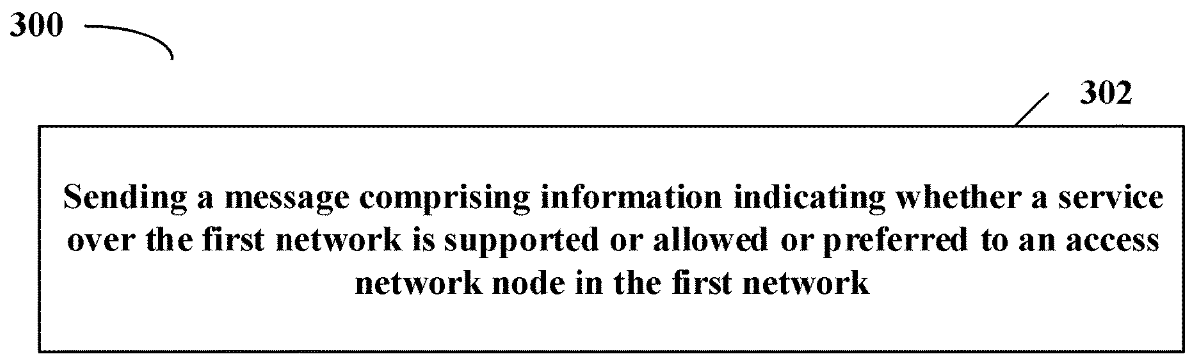
FIG. 3 shows a flowchart of a method according to another embodiment of the present disclosure.

FIG. 3 shows a flowchart of a method according to another embodiment of the present disclosure, which may be performed by an apparatus implemented in or at or as an access and mobility node in a first network or communicatively coupled to the access and mobility node in the first network. As such, the apparatus may provide means or modules for accomplishing various parts of the method 300 as well as means or modules for accomplishing other processes in conjunction with other components. For some parts which have been described in the above embodiments, the description thereof is omitted here for brevity.

At block 302, the access and mobility node may send a message comprising information indicating whether a service over the first network is supported or allowed or preferred to an access network node in the first network.

In an embodiment, the information may be obtained by the access and mobility node in various ways. For example, the access and mobility node decide whether the service over the first network is supported or allowed or preferred. The access and mobility node obtain this information from another network node.

In an embodiment, whether the service over the first network is supported or allowed or preferred is decided based on at least one of:

capability of the first network, capability of a user equipment (UE), subscription data of the UE, capability of the access network node, or a local policy.

In an embodiment, the access and mobility node comprises AMF and the access network node comprises next generation NodeB (gNB).

In an embodiment, the first network comprises new radio (NR).

In an embodiment, the information comprises an information element of support of voice over NR (VONR).

In an embodiment, the information element of support of VoNR is set to a value of at least one of:

possible, which indicates that Access and mobility Function (AMF) allows VONR, not-possible, which indicates that AMF does not allows VoNR, or preferred, which indicates that AMF allows and prefers VoNR.

In an embodiment, the information further indicates whether a redirection for the service for a second network fallback is supported or allowed or preferred.

In an embodiment, the second network comprises Evolved Packet System (EPS).

In an embodiment, the information comprises an information element of Redirection for Voice EPS Fallback.

In an embodiment, the information element Redirection for Voice EPS Fallback is set to a value of at least one of:

possible, which indicates that AMF/UE supports the redirection for voice for EPS Fallback and AMF support of VoNR is unspecified, not-possible, which indicates that AMF/UE does not support the redirection for voice for EPS Fallback and AMF support of VoNR is unspecified, voice-EPS-fallback-possible-VoNR-not-possible, which indicates that AMF/UE supports the redirection for voice for EPS Fallback and AMF support of VoNR is not allowed, voice-EPS-fallback-not-possible-VoNR-possible, which indicates that AMF/UE does not support the redirection for voice for EPS Fallback and AMF support of VoNR is allowed, voice-EPS-fallback-preferred-VoNR-possible, which indicates that AMF/UE supports and prefers the redirection for voice for EPS Fallback and AMF support of VoNR is allowed, or voice-EPS-fallback-possible-VoNR-preferred, which indicates that AMF/UE supports the redirection for voice for EPS Fallback and AMF support of VoNR is allowed and preferred.

In an embodiment, the message comprises at least one of:

a next generation application protocol (NGAP) initial context setup request message, a handover request message, or a path switch request acknowledge message.

In an embodiment, the service comprises voice service.

FIG. 4 shows a flowchart of a method according to another embodiment of the present disclosure, which may be performed by an apparatus implemented in or at or as an access and mobility node in a first network or communicatively coupled to the access and mobility node in the first network. As such, the apparatus may provide means or modules for accomplishing various parts of the method 400 as well as means or modules for accomplishing other processes in conjunction with other components. For some parts which have been described in the above embodiments, the description thereof is omitted here for brevity.

At block 402, the access and mobility node may decide whether the service over the first network is supported or allowed or preferred.

At block 404, the access and mobility node may send a message comprising information indicating whether a service over the first network is supported or allowed or preferred to an access network node in the first network.

Figure 5A:
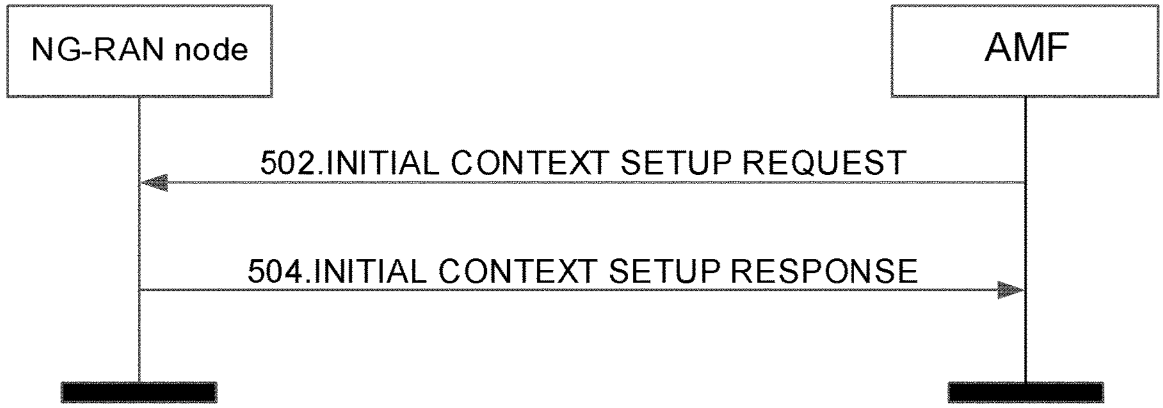
FIG. 5*a* shows a flowchart of successful operation of initial context setup according to an embodiment of the present disclosure.

FIG. 5*a* shows a flowchart of successful operation of initial context setup according to an embodiment of the present disclosure, which is same as FIG. 8.3.1.2-1 of 3GPP TS 38.413 V16.7.0.

At step 502, AMF sends an INITIAL CONTEXT SETUP REQUEST message to the NG-RAN node. The INITIAL CONTEXT SETUP REQUEST message is same as the corresponding message as described in clause 8.3.1.2 of 3GPP TS 38.413 V16.7.0 except that it may further comprise information indicating whether VoNR is supported or allowed or preferred. In an embodiment, the information may further indicate whether the redirection for voice for EPS Fallback is supported or allowed or preferred.

Upon the reception of the information, the NG-RAN node may decide how to handle the voice service. E.g. if the "Support of VONR" is not possible/allowed, NG-RAN node will not setup VoNR.

At step 504, AMF receives an INITIAL CONTEXT SETUP RESPONSE message from the NG-RAN node. The INITIAL CONTEXT SETUP RESPONSE message may be same as the corresponding message as described in clause 8.3.1.2 of 3GPP TS 38.413 V16.7.0.

Figure 5B:
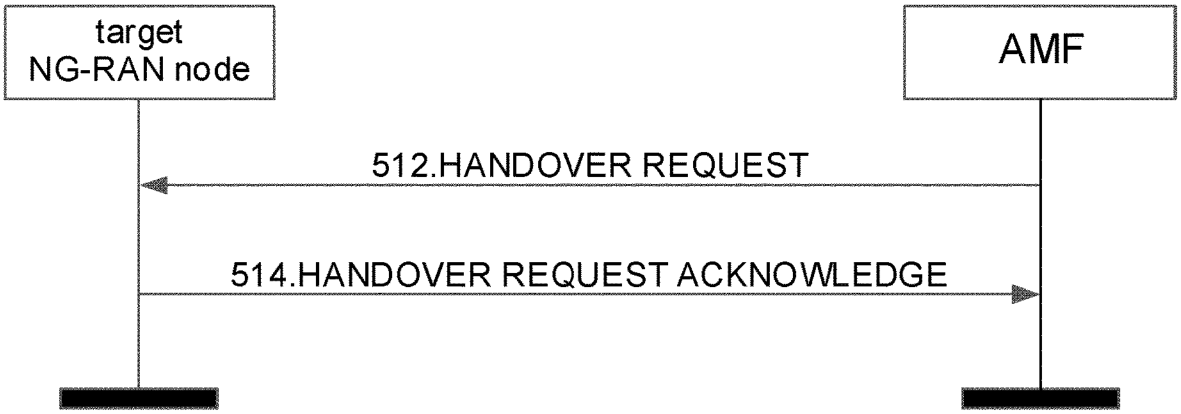
FIG. 5*b* shows a flowchart of successful operation of handover resource allocation according to an embodiment of the present disclosure.

FIG. 5*b* shows a flowchart of successful operation of handover resource allocation according to an embodiment of the present disclosure, which is same as FIG. 8.4.2.2-1 of 3GPP TS 38.413 V16.7.0.

At step 512, AMF sends a HANDOVER REQUEST message to the target NG-RAN node. The HANDOVER REQUEST message is same as the corresponding message as described in clause 8.4.2.2 of 3GPP TS 38.413 V16.7.0 except that it may further comprise information indicating whether VoNR is supported or allowed or preferred. In an embodiment, the information may further indicate whether the redirection for voice for EPS Fallback is supported or allowed or preferred.

Upon the reception of the information, the target NG-RAN node may decide how to handle the voice service. E.g. if the "Support of VoNR" is not possible/allowed, NG-RAN node will not setup VoNR.

At step 514, AMF receives a HANDOVER REQUEST ACKNOWLEDGE message from the target NG-RAN node. The HANDOVER REQUEST ACKNOWLEDGE message may be same as the corresponding message as described in clause 8.4.2.2 of 3GPP TS 38.413 V16.7.0.

Figure 5C:
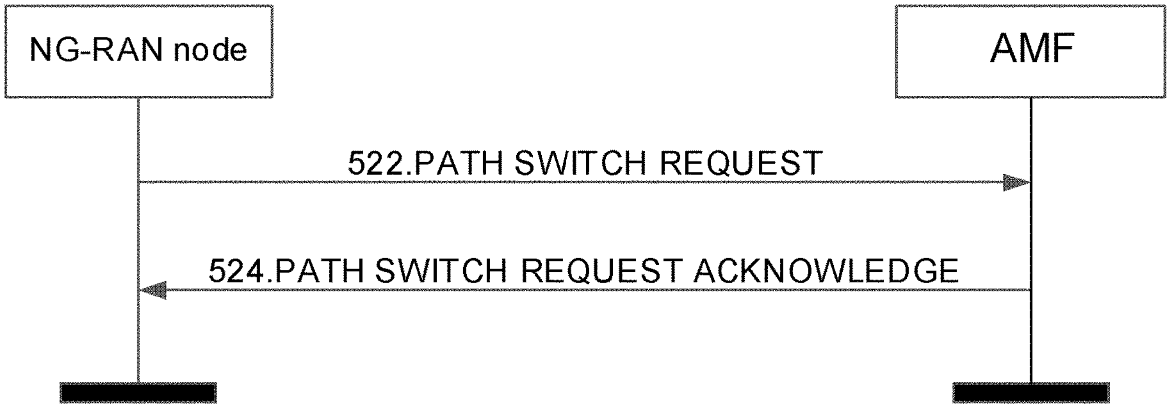
FIG. 5*c* shows a flowchart of successful operation of path switch request according to an embodiment of the present disclosure.

FIG. 5*c* shows a flowchart of successful operation of path switch request according to an embodiment of the present disclosure, which is same as FIG. 8.4.4.2-1 of 3GPP TS 38.413 V16.7.0.

At step 522, AMF sends a PATH SWITCH REQUEST message to the NG-RAN node. The PATH SWITCH REQUEST message is same as the corresponding message as described in clause 8.4.4.2 of 3GPP TS 38.413 V16.7.0 except that it may further comprise information indicating whether VoNR is supported or allowed or preferred. In an embodiment, the information may further indicate whether the redirection for voice for EPS Fallback is supported or allowed or preferred.

Upon the reception of the information, the NG-RAN node may decide how to handle the voice service. E.g. if the "Support of VONR" is not possible/allowed, NG-RAN node will not setup VoNR.

At step 524, AMF receives a PATH SWITCH REQUEST ACKNOWLEDGE message from the NG-RAN node. The PATH SWITCH REQUEST ACKNOWLEDGE message may be same as the corresponding message as described in clause 8.4.4.2 of 3GPP TS 38.413 V16.7.0.

Figure 6:
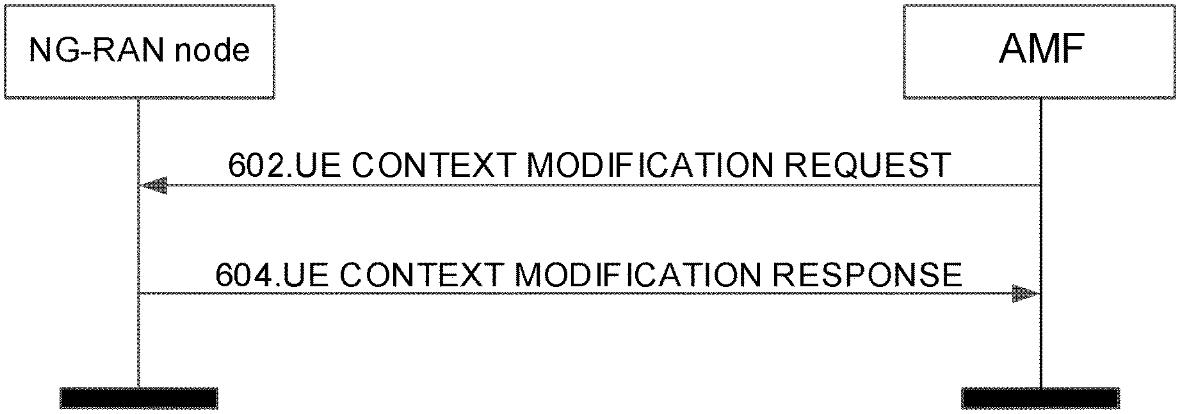
FIG. 6 shows a flowchart of successful operation of UE context modification according to an embodiment of the present disclosure.

FIG. 6 shows a flowchart of successful operation of UE context modification according to an embodiment of the present disclosure, which is same as FIG. 8.3.4.2-1 of 3GPP TS 38.413 V16.7.0.

At step 602, AMF sends a UE CONTEXT MODIFICATION REQUEST message to the NG-RAN node. The UE CONTEXT MODIFICATION REQUEST message is same as the corresponding message as described in clause 8.3.4.2 of 3GPP TS 38.413 V16.7.0 except that it may further comprise information indicating whether VoNR is supported or allowed or preferred. In an embodiment, the information may further indicate whether the redirection for voice for EPS Fallback is supported or allowed or preferred.

Upon the reception of the information, the NG-RAN node may decide how to handle the voice service. E.g. if the "Support of VONR" is not possible/allowed, NG-RAN node will not setup VoNR.

At step 604, AMF receives a UE CONTEXT MODIFICATION RESPONSE message from the NG-RAN node. The UE CONTEXT MODIFICATION RESPONSE message may be same as the corresponding message as described in clause 8.3.4.2 of 3GPP TS 38.413 V16.7.0.

According to various embodiments, it is proposed to add "Voice over NR" indication from AMF to NG-RAN. The "Voice over NR" indication can indicate to the NG-RAN if VONR should be setup or not.

Hereinafter, the solutions will be further described as follows.

Redirection for Voice EPS Fallback is used to indicate from AMF to NG-RAN node, to support various deployment scenarios for obtaining IMS voice service, that the UE and NG-RAN may support the mechanism to direct or redirect the UE from NG-RAN either towards E-UTRA connected to 5GC (RAT fallback) or towards EPS (E-UTRAN connected to EPC System fallback).

When NG-RAN node supports IMS voice, it is up to NG-RAN node to decide if to setup VoNR, or perform EPS Fallback, when such indication is set to possible.

In some scenarios, for example, roaming, the operator may desire to disallow roamers to setup VoNR. It may want to steer the roamers to the EPC network.

Currently in NGAP, the Redirection for Voice EPS Fallback only indicate if the EPS Fallback is possible or not.

The IE "Redirection for Voice EPS Fallback" as described in 3GPP TS 38.413 V16.7.0 can be extended for an addition code point to indicate that "voice fallback to EPC is possible but VoNR is not".

With the extended code point, there would be no backwards compatibility issue. The existing code point "possible" and "not possible" are used, as today, to indicate if the voice EPS fallback is possible or not. The VoNR allowed or not is unspecified, and it is totally up to NG-RAN node to decide.

With the third code point, "voice EPS Fallback possible, VoNR not possible", NG-RAN node, if supporting IMS voice, will not setup VoNR, but instead using Fallback mechanism.

Proposal 1: It is proposed to add a code point in Redirection for Voice EPS Fallback to indicate that when voice EPS fallback is possible and VoNR is not allowed.

Hereinafter, the solutions will be further described as follows.

For roamers, the operator may only want to support voice EPS fallback but not VoNR. Currently it is not possible to indicate to NG-RAN node if it should setup VoNR. It is totally up to NG-RAN node to decide to perform voice EPS fallback or VoNR setup.

It is proposed to add a code point in Redirection for Voice EPS Fallback "voice-EPS-fallback-possible-VoNR-not-possible". The change has limited impact to the Voice EPS Fallback procedure. The change is backwards compatible.

In an embodiment, clause 9.3.1.116 of 3GPP TS 38.413 V16.7.0 may be amended as following.

9.3.1.116 Redirection for Voice EPS Fallback

This IE is used to indicate that the AMF and the UE support the redirection for voice for EPS Fallback.

This IE is also used to indicate that the AMF disallows to setup VoNR.

| IE/Group Name | Presence | Range | IE type and reference | Semantics description |
|---|---|---|---|---|
| Redirection for Voice EPS Fallback | M | | ENUMERATED (possible, not-possible, . . . , voice-EPS-fallback-possible-VoNR-not-possible) | Value "possible" indicates AMF/UE support the redirection for voice for EPS Fallback. AMF support of VoNR is unspecified; Value "not-possible" indicates AMF/UE does not support the redirection for voice for EPS Fallback. AMF support of VoNR is unspecified; Value "voice-EPS-fallback-possible-VoNR-not-possible" indicates that AMF/UE support the redirection for voice for EPS Fallback. AMF support of VoNR is not allowed. |

In an embodiment, clause 9.4.5 of 3GPP TS 38.413 V16.7.0 may be amended as following.

```
9.4.5                    Information Element Definitions
-- ASN1START
-- **************************************************************
--
-- Information Element Definitions
--
-- **************************************************************
NGAP-IEs {
itu-t (0) identified-organization (4) etsi (0) mobileDomain (0)
ngran-Access (22) modules (3) ngap (1) version1 (1) ngap-IEs (2) }
```

-continued

```
DEFINITIONS AUTOMATIC TAGS ::=
BEGIN
******************************
Skip to the next Change
******************************
-- R
RANNodeName ::= PrintableString (SIZE(1..150, ...))
RANPagingPriority ::= INTEGER (1..256)
RANStatusTransfer-TransparentContainer ::= SEQUENCE {
   dRBsSubjectToStatusTransferList    DRBsSubjectToStatusTransferList,
   iE-Extensions                       ProtocolExtensionContainer
{ {RANStatusTransfer-TransparentContainer-ExtIEs} } OPTIONAL,
   ...
}
RANStatusTransfer-TransparentContainer-ExtIEs NGAP-PROTOCOL-EXTENSION ::= {
   ...
}
RAN-UE-NGAP-ID ::= INTEGER (0..4294967295)
RATRestrictions ::= SEQUENCE (SIZE(1..maxnoofEPLMNsPlusOne)) OF RATRestrictions-Item
RATRestrictions-Item ::= SEQUENCE {
   pLMNIdentity                              PLMNIdentity,
   rATRestrictionInformation                 RATRestrictionInformation,
   iE-Extensions                       ProtocolExtensionContainer { {RATRestrictions-Item-ExtIEs} }
   OPTIONAL,
   ...
}
RATRestrictions-Item-ExtIEs NGAP-PROTOCOL-EXTENSION ::= {
   ...
}
RATRestrictionInformation ::= BIT STRING (SIZE(8, ...))
RecommendedCellsForPaging ::= SEQUENCE {
   recommendedCellList                     RecommendedCellList,
   iE-Extensions                       ProtocolExtensionContainer { {RecommendedCellsForPaging-ExtIEs} }
   OPTIONAL,
   ...
}
RecommendedCellsForPaging-ExtIEs NGAP-PROTOCOL-EXTENSION ::= {
   ...
}
RecommendedCellList ::= SEQUENCE ( SIZE (1..maxnoofRecommendedCells)) OF RecommendedCellItem
RecommendedCellItem ::= SEQUENCE {
   nGRAN-CGI                             NGRAN-CGI,
   timeStayedInCell                      INTEGER (0..4095)    OPTIONAL,
   iE-Extensions                       ProtocolExtensionContainer { {RecommendedCellItem-ExtIEs} } OPTIONAL,
   ...
}
RecommendedCellItem-ExtIEs NGAP-PROTOCOL-EXTENSION ::= {
   ...
}
RecommendedRANNodesForPaging ::= SEQUENCE {
   recommendedRANNodeList                  RecommendedRANNodeList,
   iE-Extensions                       ProtocolExtensionContainer { {RecommendedRANNodes ForPaging-ExtIEs} }
   OPTIONAL,
   ...
}
RecommendedRANNodesForPaging-ExtIEs NGAP-PROTOCOL-EXTENSION ::= {
   ...
}
RecommendedRANNodeList::= SEQUENCE (SIZE(1..maxnoofRecommendedRANNodes)) OF RecommendedRANNodeItem
RecommendedRANNodeItem ::= SEQUENCE {
   aMFPagingTarget                     AMFPagingTarget,
   iE-Extensions                       ProtocolExtensionContainer { {RecommendedRANNodeItem-ExtIEs} } OPTIONAL,
   ...
}
RecommendedRANNodeItem-ExtIEs NGAP-PROTOCOL-EXTENSION ::= {
   ...
}
RedirectionVoiceFallback ::= ENUMERATED {
   possible,
   not-possible,
   ...,
   voice-EPS-fallback-possible-VoNR-not-possible
}
```

Figure 7:
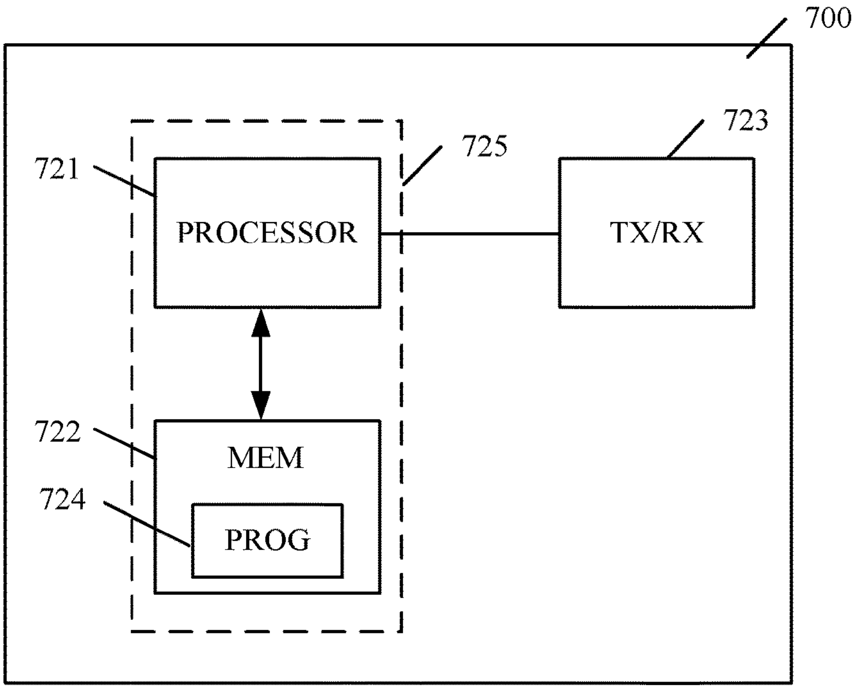
FIG. 7 is a block diagram showing an apparatus suitable for practicing some embodiments of the disclosure.

FIG. 7 is a block diagram showing an apparatus suitable for practicing some embodiments of the disclosure. For example, any one of the access and mobility node or the access network node described above may be implemented as or through the apparatus 700.

The apparatus 700 comprises at least one processor 721, such as a digital processor (DP), and at least one memory (MEM) 722 coupled to the processor 721. The apparatus 700 may further comprise a transmitter TX and receiver RX 723 coupled to the processor 721. The MEM 722 stores a program (PROG) 724. The PROG 724 may include instructions that, when executed on the associated processor 721, enable the apparatus 700 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the access network node, the memory 722 contains instructions executable by the processor 721, whereby the access network node operates according to any of the methods related to the access network node as described above.

In an embodiment where the apparatus is implemented as or at the access and mobility node, the memory 722 contains instructions executable by the processor 721, whereby the access and mobility node operates according to any of the methods related to the access and mobility node as described above.

Figure 8A:
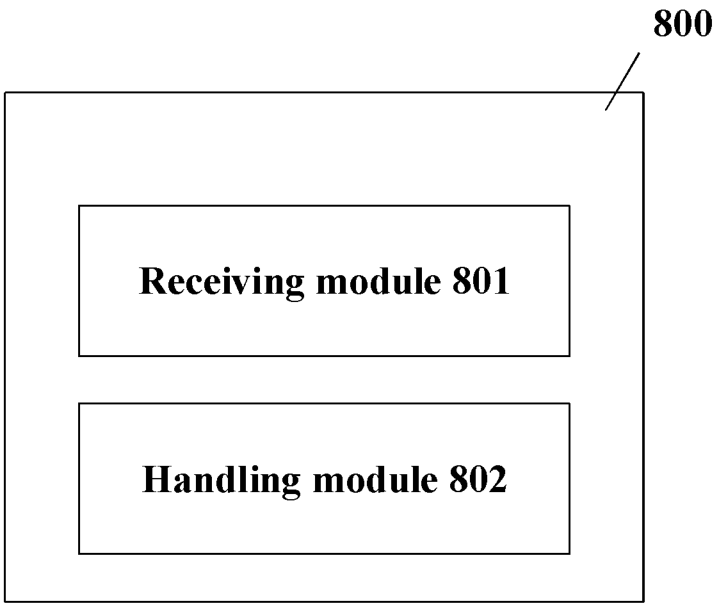
FIG. 8*a* is a block diagram showing an access network node according to an embodiment of the disclosure.

FIG. 8*a* is a block diagram showing an access network node according to an embodiment of the disclosure. As shown, the access network node 800 comprises a receiving module 801 and a handling module 802. The receiving module 801 may be configured to receive a message comprising information indicating whether a service over the first network is supported or allowed or preferred from an access and mobility node in the first network. The handling module 802 may be configured to handle the service based on the information.

Figure 8B:
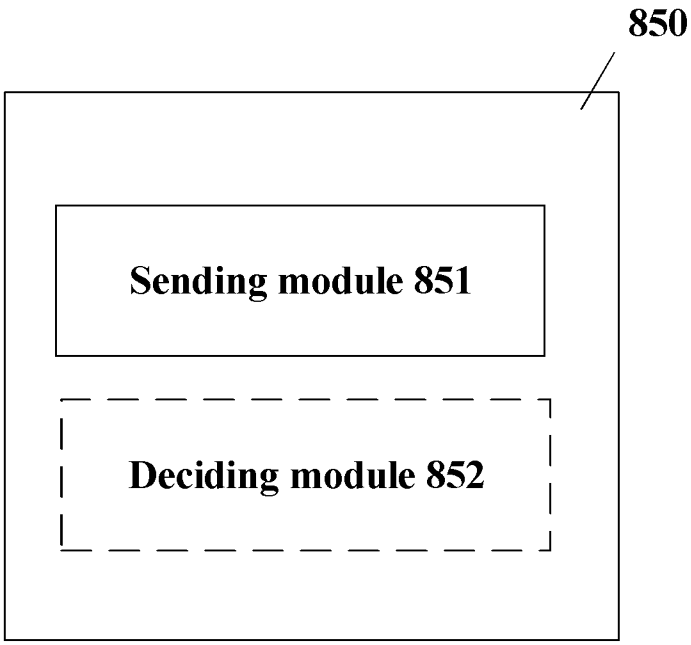
FIG. 8*b* is a block diagram showing an access and mobility node 850 according to an embodiment of the disclosure.

FIG. 8*b* is a block diagram showing an access and mobility node 850 according to an embodiment of the disclosure. As shown, the access and mobility node 850 comprises a sending module 851. The sending module 851 may be configured to send a message comprising information indicating whether a service over the first network is supported or allowed or preferred to an access network node in the first network.

In an embodiment, the access and mobility node 850 further comprises a deciding module 852 configured to decide whether the service over the first network is supported or allowed or preferred.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the access and mobility node or the access network node may not need a fixed processor or memory, any computing resource and storage resource may be arranged from the access and mobility node or the access network node in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Embodiments herein may provide many advantages, of which a non-exhaustive list of examples follows. In some embodiments herein, the proposed solutions can achieve flexible control of service (such as VoNR or voice EPS Fallback) for example based on a local policy in the access and mobility node such as AMF. The embodiments herein are not limited to the features and advantages mentioned above. A person skilled in the art will recognize additional features and advantages upon reading the following detailed description.

Further, the exemplary overall commutation system including the terminal device and the network node will be introduced as below.

Embodiments of the present disclosure provide a communication system including a host computer including: processing circuitry configured to provide user data; and a communication interface configured to forward the user data to a cellular network for transmission to a terminal device. The cellular network includes a base station such as the access network node above mentioned, and/or a terminal device such as UE.

In embodiments of the present disclosure, the system further includes the terminal device. The terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned.

In embodiments of the present disclosure, the processing circuitry of the host computer is configured to execute a host application. The terminal device is configured to execute a client application associated with the host application, thereby providing the user data to be received by the host computer via the base station. The base station is above mentioned.

Figure 9:
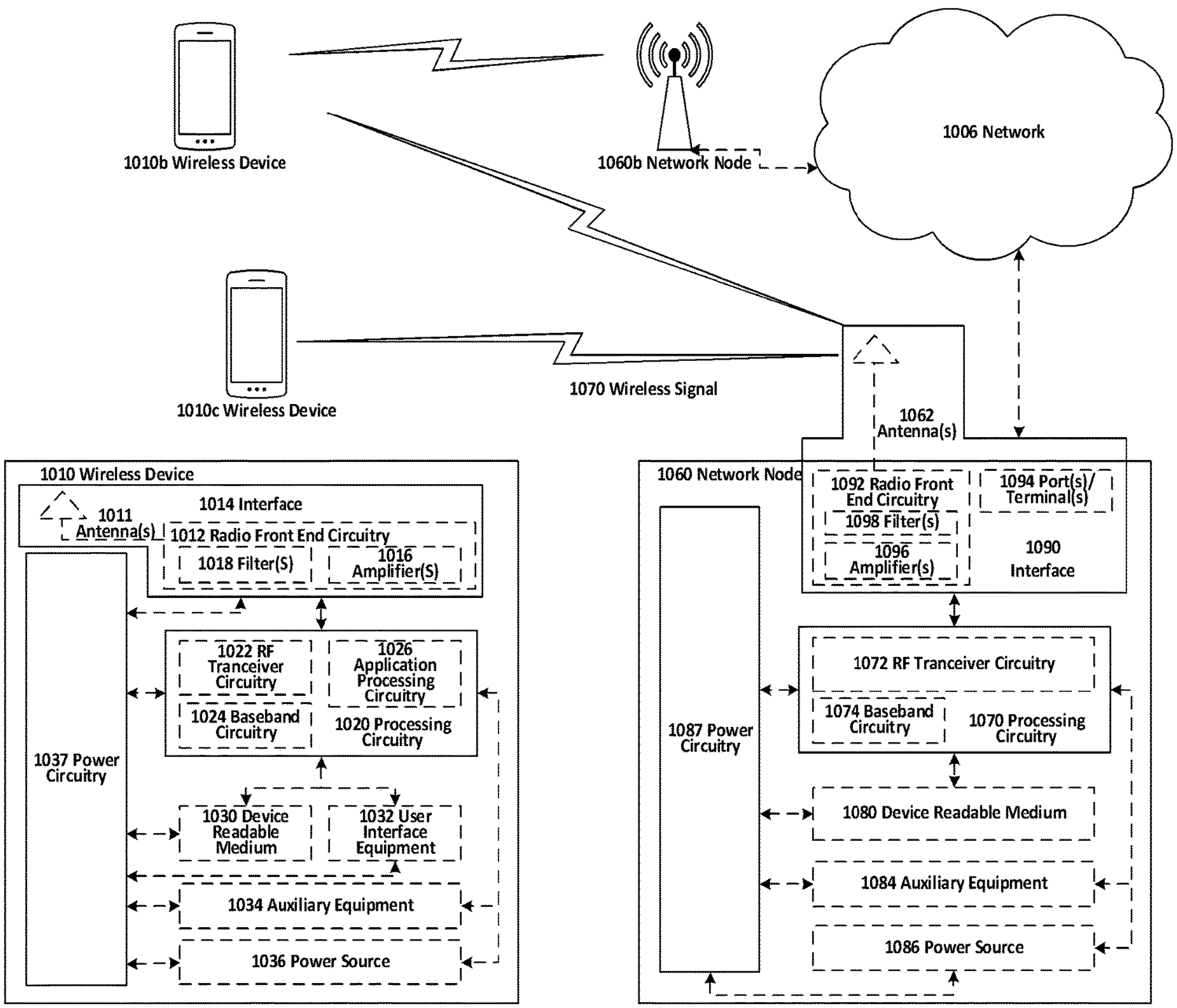
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
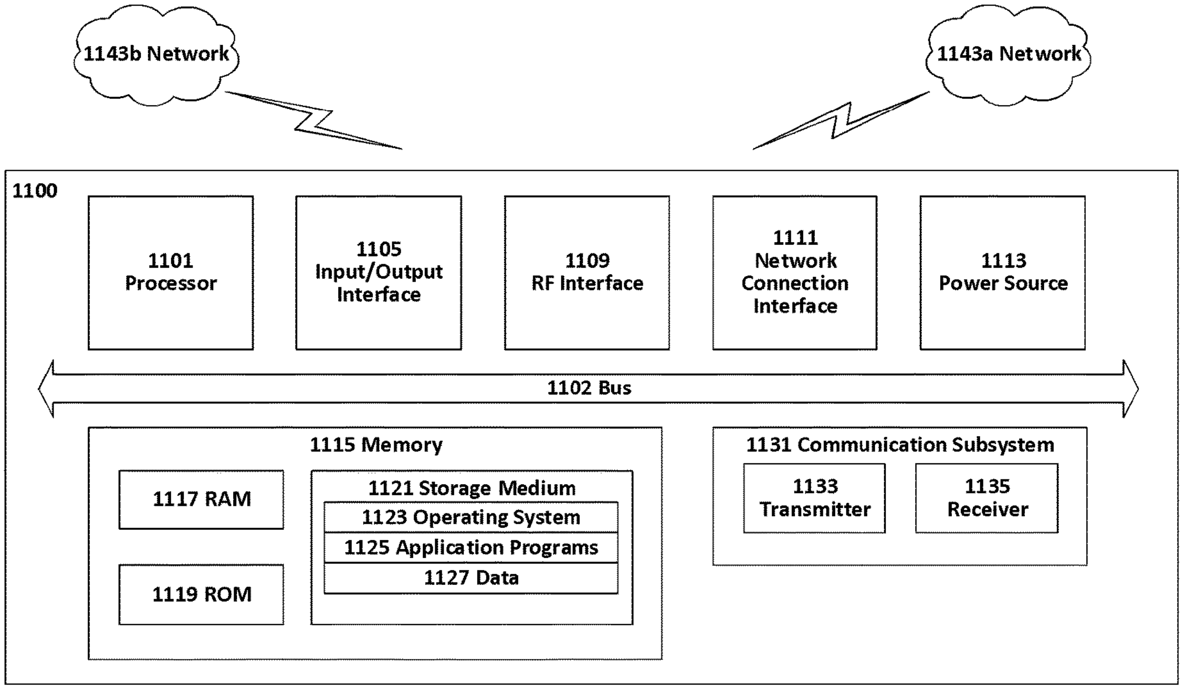
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
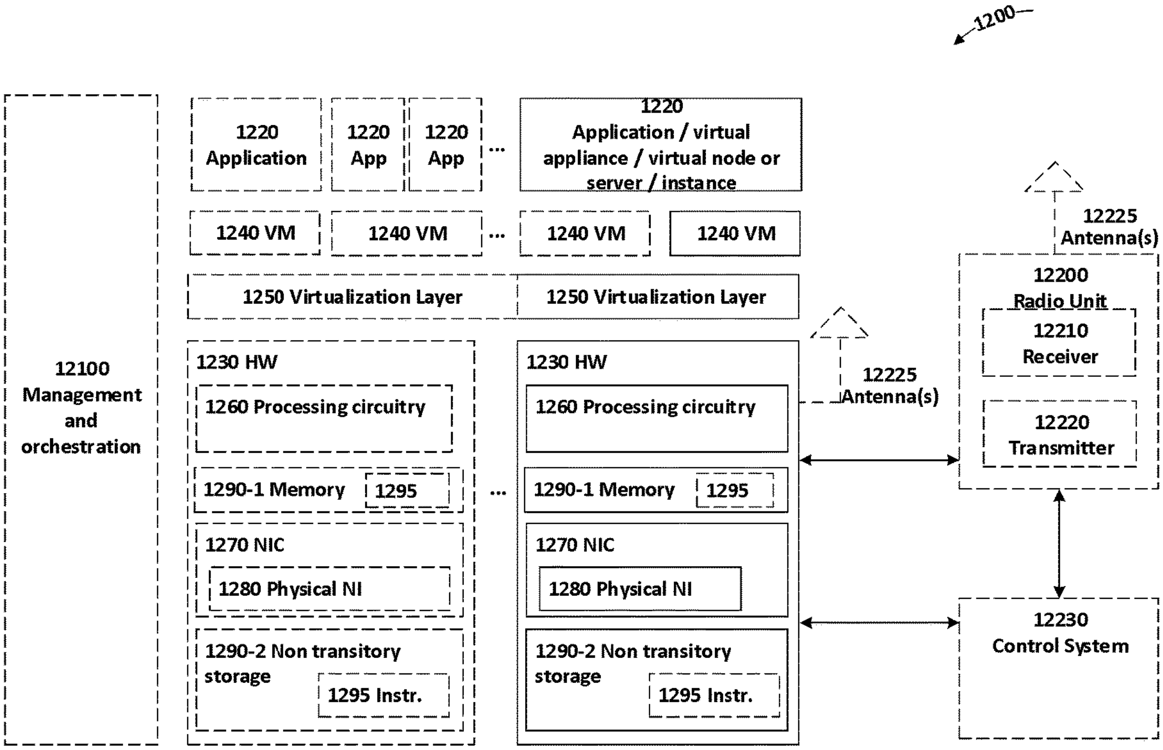
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290-1. Memory 1290-1 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be effected with the use of control system 12230 which may alternatively be used for communication between the hardware nodes 1230 and radio units 12200.

Figure 12:
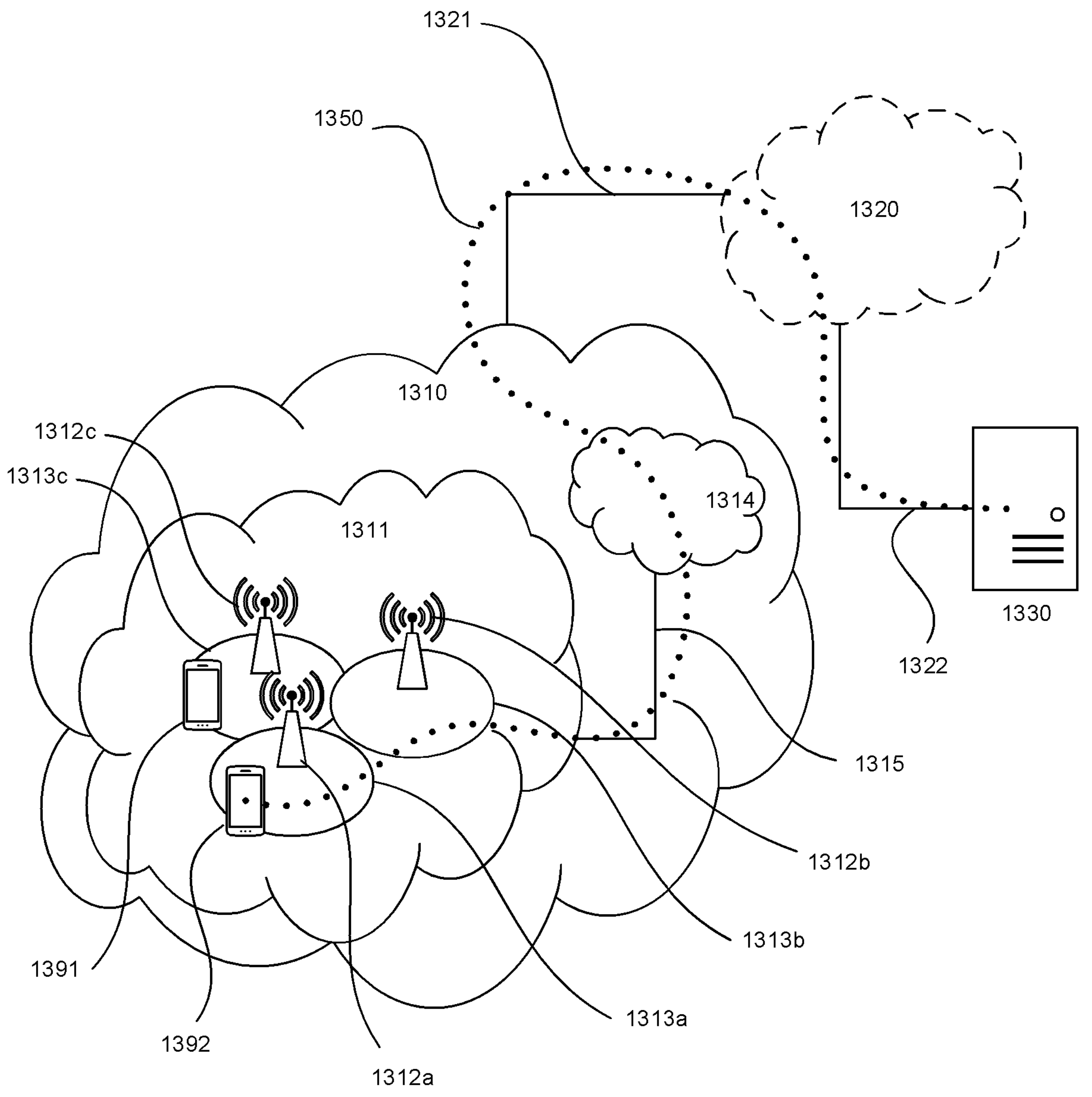
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312*a* or 1312*b* or 1312*c*.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312*a* or 1312*b* or 1312*c* may not or need not be informed about the past routing of an incoming downlink communication with data originating from host computer 1330 to be forwarded (e.g., handed over) to a connected UE 1391. Similarly, base station 1312*a* or 1312*b* or 1312*c* need not be aware of the future routing of an outgoing uplink communication originating from the UE 1391 towards the host computer 1330.

Figure 13:
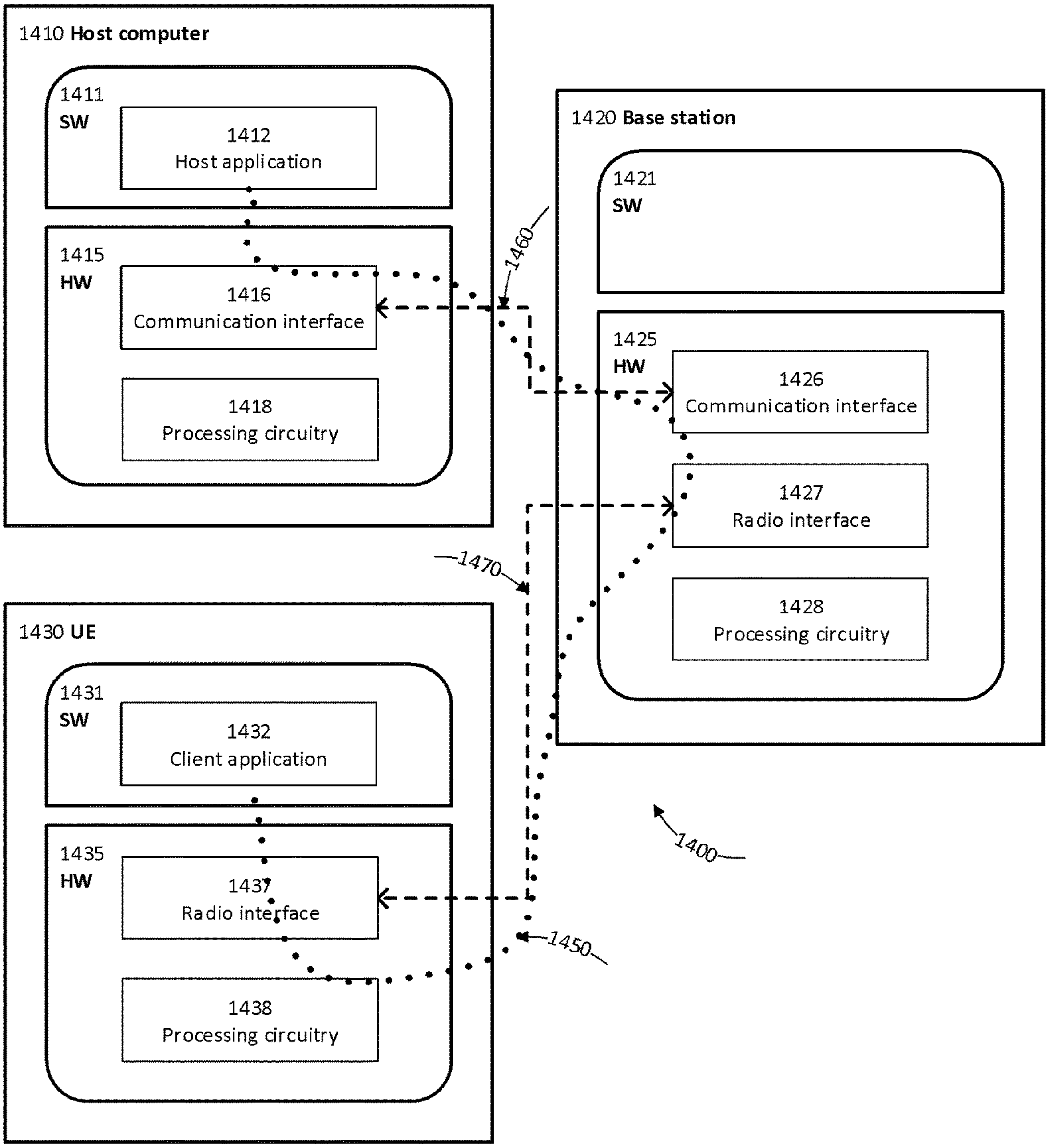
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may achieve flexible control of service (such as VoNR or voice EPS Fallback) for example based on a local policy in the access and mobility node such as AMF.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
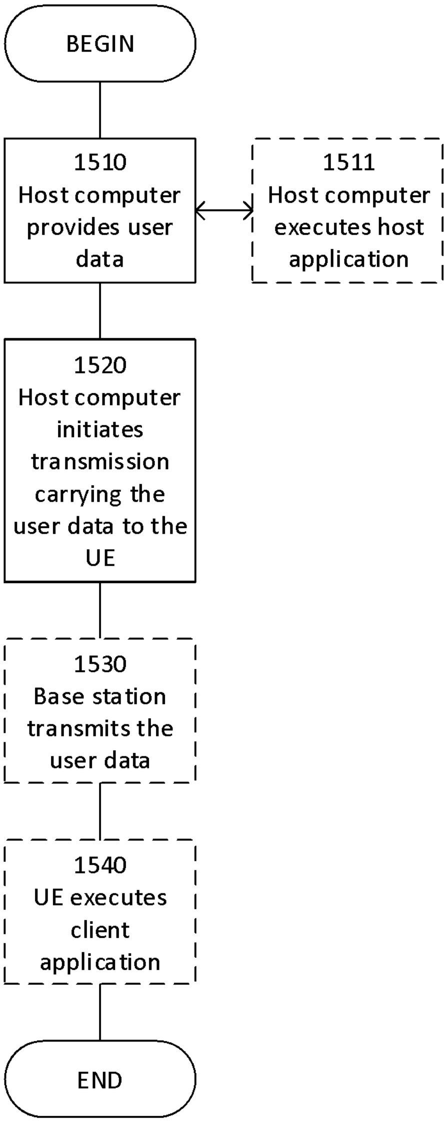
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
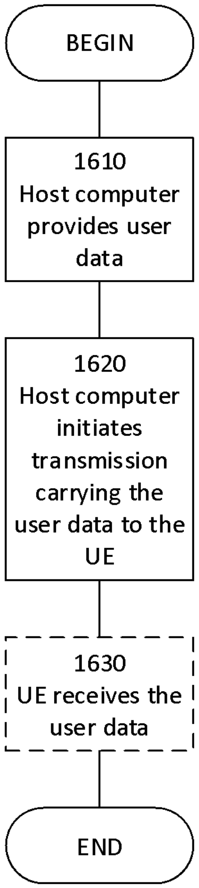
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
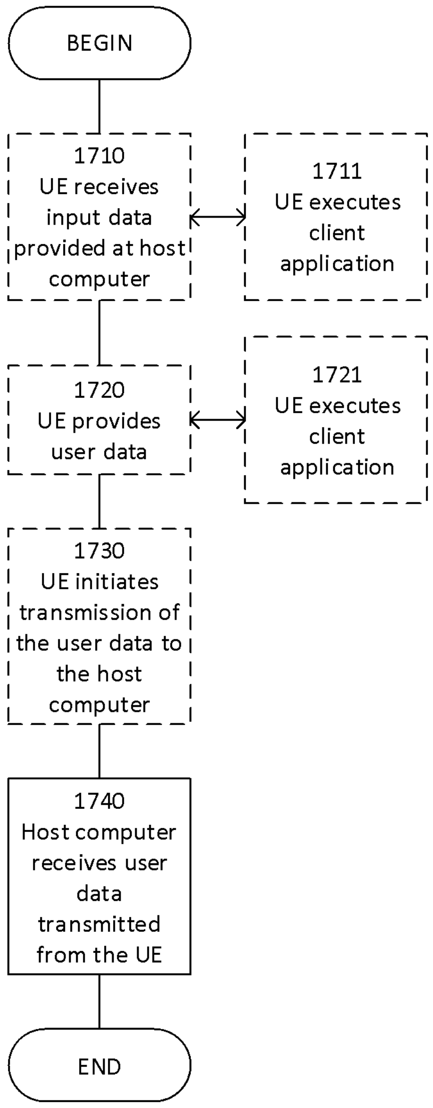
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
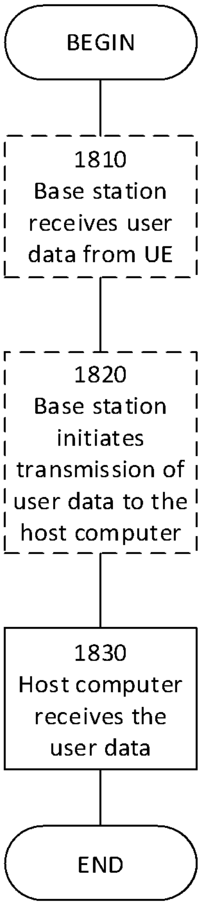
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by an access network node in a first network, comprising:

receiving a message comprising information from an access and mobility node in the first network, wherein:

the information is capable of indicating each of the following: whether a service over the first network is supported, whether the service over the first network is allowed, and whether the service over the first network is preferred; and the information comprises an information element of support of voice over NR (VoNR), the information element of support of VoNR being set to a value of one of: “possible” indicating that Access and mobility Function (AMF) allows VoNR, “not-possible” indicating that AMF does not allows VoNR, and “preferred” indicating that AMF allows and prefers VoNR; and handling the service based on the information.

2. The method according to claim 1, wherein whether the service over the first network is supported or allowed or preferred is decided based on at least one of:

capability of the first network, capability of a user equipment (UE), subscription data of the UE, capability of the access network node, or a local policy.

3. The method according to claim 1, wherein the access and mobility node comprises AMF and the access network node comprises next generation NodeB (gNB); and wherein the first network comprises new radio (NR).

4. The method according to claim 1, wherein the information further indicates whether a redirection for the service for a second network fallback is supported or allowed or preferred.

5. The method according to claim 4, wherein the second network comprises Evolved Packet System (EPS); and wherein the information comprises an information element of Redirection for Voice EPS Fallback.

6. The method according to claim 5, wherein the information element of Redirection for Voice EPS Fallback is set to a value of at least one of:

possible, which indicates that AMF/UE supports the redirection for voice EPS Fallback and AMF support of VoNR is unspecified, not-possible, which indicates that AMF/UE does not support the redirection for voice EPS Fallback and AMF support of VoNR is unspecified, voice-EPS-fallback-possible-VoNR-not-possible, which indicates that AMF/UE supports the redirection voice for EPS Fallback and AMF support of VoNR is not allowed, voice-EPS-fallback-not-possible-VoNR-possible, which indicates that AMF/UE does not support the redirection for voice EPS Fallback and AMF support of VoNR is allowed, voice-EPS-fallback-preferred-VoNR-possible, which indicates that AMF/UE supports and prefers the redirection for voice EPS Fallback and AMF support of VoNR is allowed, or voice-EPS-fallback-possible-VoNR-preferred, which indicates that AMF/UE supports the redirection for voice EPS Fallback and AMF support of VoNR is allowed and preferred.

7. The method according to claim 1, wherein the message comprises at least one of:

a next generation application protocol (NGAP) initial context setup request message, a handover request message, or a path switch request acknowledge message.

8. The method according to claim 1, wherein handling the service based on the information comprises at least one of:

when the access and mobility node does not allow the service over the first network, the access network node supports the service over the first network, and a redirection for the service for a second network fallback is supported, performing the second network fallback, when the access and mobility node supports and prefers the service over the first network, the access network node supports the service over the first network, setting up the service over the first network, or when the access and mobility node prefers a redirection for the service for a second network fallback, the access network node supports the redirection for the service for a second network fallback, performing the second network fallback.

9. A method performed by an access and mobility node in a first network, comprising:

sending a message comprising information to an access network node in the first network, wherein:

the information is capable of indicating each of the following: whether a service over the first network is supported, whether the service over the first network is allowed, and whether the service over the first network is preferred; and the information comprises an information element of support of voice over NR (VoNR), the information element of support of VoNR being set to a value of one of: "possible" indicating that Access and mobility Function (AMF) allows VoNR, "not-possible" indicating that AMF does not allows VoNR, and "preferred" indicating that AMF allows and prefers VoNR.

10. The method according to claim 9, further comprising: deciding whether the service over the first network is supported or allowed or preferred.

11. The method according to claim 10, wherein whether the service over the first network is supported or allowed or preferred is decided based on at least one of:

capability of the first network, capability of a user equipment (UE), subscription data of the UE, capability of the access network node, or a local policy.

12. The method according to claim 9, wherein the access and mobility node comprises AMF and the access network node comprises next generation NodeB (gNB); and wherein the first network comprises new radio (NR).

13. The method according to claim 9, wherein the information further indicates whether a redirection for the service for a second network fallback is supported or allowed or preferred.

14. The method according to claim 13, wherein the second network comprises Evolved Packet System (EPS); and wherein the information comprises an information element of Redirection for Voice EPS Fallback.

15. The method according to claim 14, wherein the information element Redirection for Voice EPS Fallback is set to a value of at least one of:

possible, which indicates that AMF/UE supports the redirection for voice EPS Fallback and AMF support of VoNR is unspecified, not-possible, which indicates that AMF/UE does not support the redirection for voice EPS Fallback and AMF support of VoNR is unspecified, voice-EPS-fallback-possible-VoNR-not-possible, which indicates that AMF/UE supports the redirection for voice EPS Fallback and AMF support of VoNR is not allowed, voice-EPS-fallback-not-possible-VoNR-possible, which indicates that AMF/UE does not support the redirection for voice EPS Fallback and AMF support of VoNR is allowed, voice-EPS-fallback-preferred-VoNR-possible, which indicates that AMF/UE supports and prefers the redirection for voice EPS Fallback and AMF support of VoNR is allowed, or voice-EPS-fallback-possible-VoNR-preferred, which indicates that AMF/UE supports the redirection for voice EPS Fallback and AMF support of VoNR is allowed and preferred.

16. The method according to claim 9, wherein the message comprises at least one of:

a next generation application protocol (NGAP) initial context setup request message, a handover request message, or a path switch request acknowledge message.

17. The method according to claim 9, wherein the service comprises voice service.

18. An access network node in a first network, comprising:

a processor; and a memory coupled to the processor, said memory containing instructions executable by said processor, whereby said access network node is operative to:

receive a message comprising information from an access and mobility node in the first network, wherein:

the information is capable of indicating each of the following: whether a service over the first network is supported, whether the service over the first network is allowed, and whether the service over the first network is preferred; and the information comprises an information element of support of voice over NR (VoNR), the information element of support of VoNR being set to a value of one of:

"possible" indicating that Access and mobility Function (AMF) allows VoNR, "not-possible" indicating that AMF does not allows VoNR, and "preferred" indicating that AMF allows and prefers VoNR; and handle the service based on the information.

* * * * *